(12) United States Patent
Lai et al.

(10) Patent No.: US 12,055,684 B2
(45) Date of Patent: Aug. 6, 2024

(54) OPTICAL IMAGING LENS

(71) Applicant: GENIUS ELECTRONIC OPTICAL (XIAMEN) CO., LTD., Fujian (CN)

(72) Inventors: Yongfeng Lai, Fujian (CN); Maozong Lin, Fujian (CN); Jia-Sin Jhang, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 726 days.

(21) Appl. No.: 17/189,263

(22) Filed: Mar. 2, 2021

(65) Prior Publication Data

US 2022/0196977 A1    Jun. 23, 2022

(30) Foreign Application Priority Data

Dec. 18, 2020   (CN) .......................... 202011503818.7

(51) Int. Cl.
  *G02B 13/00*   (2006.01)
  *G02B 9/64*    (2006.01)
(52) U.S. Cl.
  CPC ........... *G02B 13/0045* (2013.01); *G02B 9/64* (2013.01)
(58) Field of Classification Search
  CPC .............................. G02B 13/0045; G02B 9/64
  USPC ......................................................... 359/754
  See application file for complete search history.

(56) References Cited

U.S. PATENT DOCUMENTS

2020/0209594 A1   7/2020   Hirano

FOREIGN PATENT DOCUMENTS

| CN | 105866932 | 8/2016 |
|----|-----------|--------|
| CN | 111381350 | 7/2020 |
| CN | 111766685 | 10/2020 |
| CN | 111812811 | 10/2020 |
| CN | 111812814 | 10/2020 |
| CN | 111812816 | 10/2020 |
| CN | 111812818 | 10/2020 |
| CN | 114114610 | 3/2022 |
| JP | 202013996 | 9/2020 |
| TW | 202045974 | 12/2020 |

OTHER PUBLICATIONS

"Office Action of Taiwan Counterpart Application", issued on Jul. 13, 2021, p. 1-p. 18.

(Continued)

*Primary Examiner* — Joseph P Martinez
*Assistant Examiner* — Grant A Gagnon
(74) *Attorney, Agent, or Firm* — JCIPRNET

(57) ABSTRACT

An optical imaging lens, sequentially including a first, second, third, fourth, fifth, sixth, seventh, eighth, and ninth lens elements along an optical axis from an object side to an image side, is provided. Each of the first to ninth lens elements includes an object-side surface facing the object side and allowing imaging rays to pass through, and an image-side surface facing the image side and allowing the imaging rays to pass through. The first lens element has positive refracting power, and a periphery region of the image-side surface is concave. An optical axis region of the object-side surface of the second lens element is convex. An optical axis region of the image-side surface of the ninth lens element is concave. Lens elements of the optical imaging lens are only the nine lens elements, and the optical imaging lens satisfies the following conditional expressions: $V1+V2 \leq 80.000$ and $V3+V7 \geq 50.000$.

20 Claims, 31 Drawing Sheets

(56) References Cited

OTHER PUBLICATIONS

"Office Action of China Counterpart Application", issued on Dec. 22, 2021, p. 1-p. 14.
"Office Action of China Counterpart Application", issued on May 11, 2022, p. 1-p. 9.
"Office Action of Taiwan Counterpart Application", issued on Nov. 30, 2023, p. 1-p. 12.

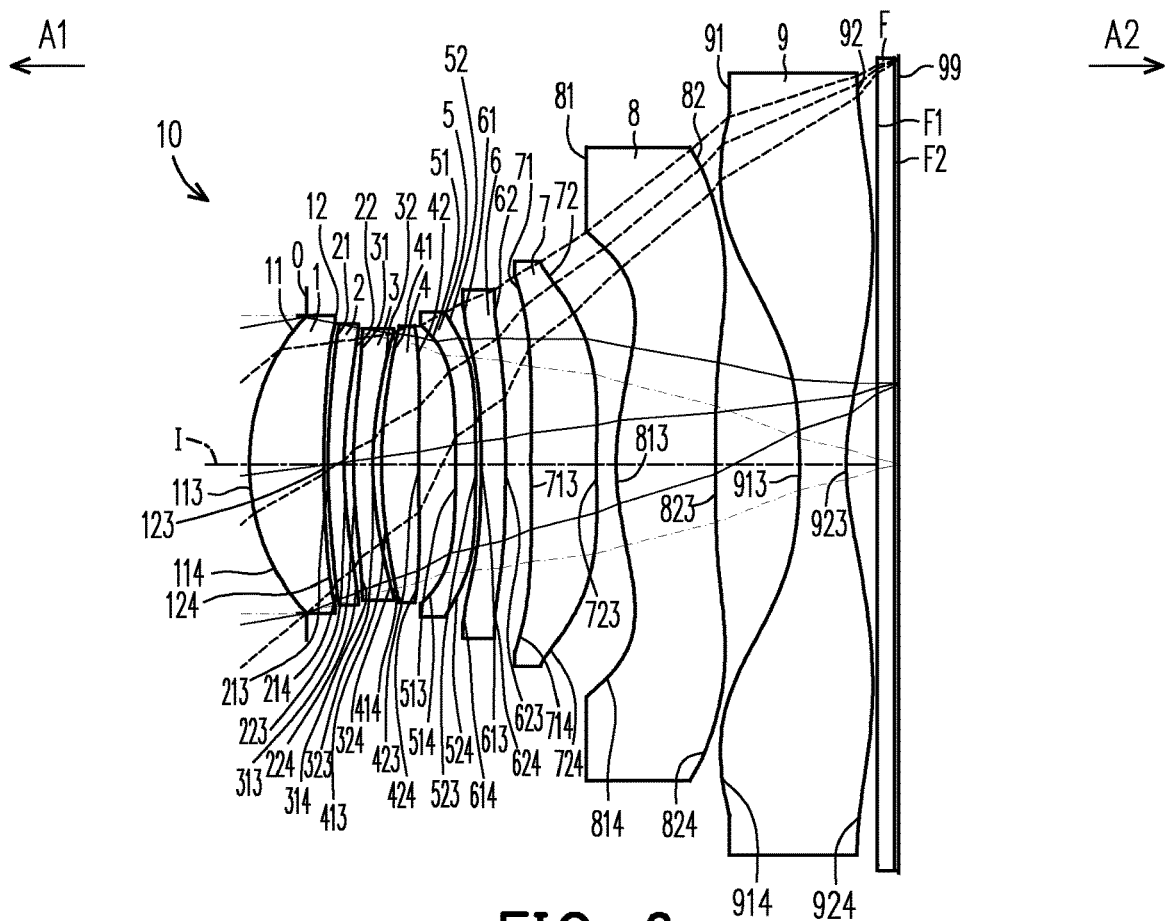
FIG. 6
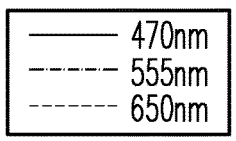
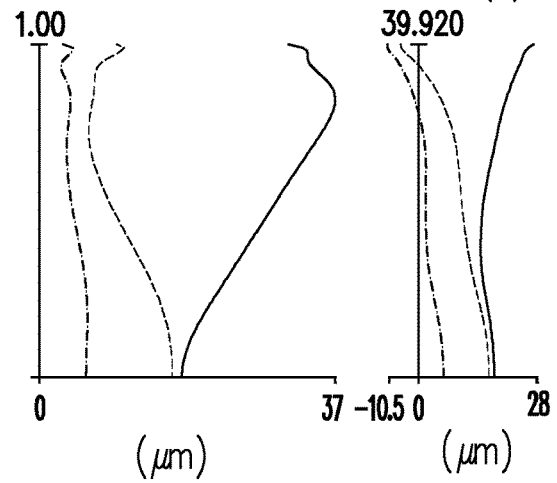
FIG. 7A
FIG. 7B
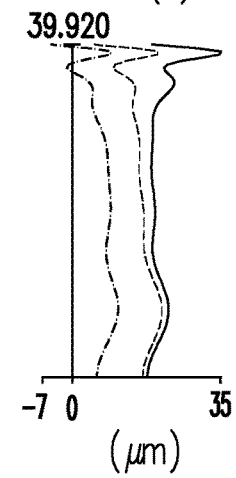
FIG. 7C
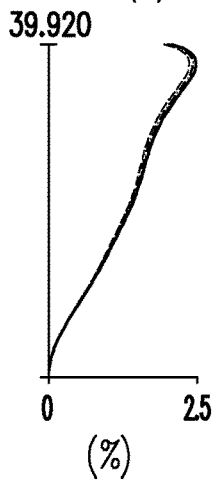
FIG. 7D

| First embodiment | | | | | | |
|---|---|---|---|---|---|---|
| EFL = 5.868 mm, HFOV = 39.920°, TTL = 7.974 mm, Fno = 1.600, ImgH = 5.000 mm | | | | | | |
| Element | Surface | Radius of curvature (mm) | Thickness (mm) | Refractive index | Abbe number | Focal length (mm) |
| Object | | Infinity | Infinity | | | |
| Aperture 0 | | Infinity | -0.694 | | | |
| First lens element 1 | Object-side surface 11 | 2.900 | 0.907 | 1.531 | 49.620 | 6.888 |
| | Image-side surface 12 | 12.269 | 0.052 | | | |
| Second lens element 2 | Object-side surface 21 | 7.943 | 0.200 | 1.671 | 19.243 | -34.402 |
| | Image-side surface 22 | 5.864 | 0.117 | | | |
| Third lens element 3 | Object-side surface 31 | 7.262 | 0.238 | 1.671 | 19.243 | -18.536 |
| | Image-side surface 32 | 4.540 | 0.105 | | | |
| Fourth lens element 4 | Object-side surface 41 | 6.182 | 0.458 | 1.545 | 55.987 | 12.909 |
| | Image-side surface 42 | 48.796 | 0.454 | | | |
| Fifth lens element 5 | Object-side surface 51 | -22.837 | 0.250 | 1.671 | 19.243 | 212.787 |
| | Image-side surface 52 | -19.801 | 0.067 | | | |
| Sixth lens element 6 | Object-side surface 61 | -12.893 | 0.298 | 1.671 | 19.243 | -24.180 |
| | Image-side surface 62 | -61.100 | 0.313 | | | |
| Seventh lens element 7 | Object-side surface 71 | 30.847 | 0.800 | 1.545 | 55.987 | -49.251 |
| | Image-side surface 72 | 14.239 | 0.241 | | | |
| Eighth lens element 8 | Object-side surface 81 | 3.247 | 1.228 | 1.545 | 55.987 | 5.745 |
| | Image-side surface 82 | -81.646 | 1.032 | | | |
| Ninth lens element 9 | Object-side surface 91 | -9.671 | 0.569 | 1.545 | 55.987 | -4.418 |
| | Image-side surface 92 | 3.283 | 0.382 | | | |
| Filter F | Object-side surface F1 | Infinity | 0.210 | 1.517 | 64.167 | |
| | Image-side surface F2 | Infinity | 0.052 | | | |
| | Image plane 99 | Infinity | | | | |

FIG. 8

| Surface | K | $a_4$ | $a_6$ | $a_8$ | $a_{10}$ |
|---|---|---|---|---|---|
| 11 | 0.000000E+00 | 1.518725E-03 | 5.587883E-04 | -2.978147E-05 | 2.440931E-05 |
| 12 | 0.000000E+00 | -7.204294E-03 | 4.685648E-03 | -1.653755E-03 | 8.991345E-04 |
| 21 | 0.000000E+00 | -9.353695E-03 | -5.707347E-03 | 4.707810E-03 | -6.328617E-04 |
| 22 | 6.250031E-01 | 1.006053E-02 | -2.695191E-02 | 1.420985E-02 | -3.264142E-03 |
| 31 | -2.564127E+00 | 1.178874E-02 | -3.344357E-02 | 2.335359E-02 | -9.890222E-03 |
| 32 | 7.849306E-01 | 4.910039E-03 | -2.926045E-02 | 2.625638E-02 | -1.240058E-02 |
| 41 | 0.000000E+00 | 8.755059E-03 | -1.454853E-02 | 8.384362E-03 | -1.504824E-03 |
| 42 | 0.000000E+00 | -2.500783E-03 | -3.071042E-03 | -6.826852E-04 | 1.309822E-03 |
| 51 | 0.000000E+00 | -1.029620E-02 | -2.539759E-02 | 2.187164E-02 | -2.027493E-02 |
| 52 | 0.000000E+00 | 1.865912E-02 | -4.824849E-02 | 2.237103E-02 | -8.200504E-04 |
| 61 | 0.000000E+00 | 8.972885E-03 | -2.498453E-02 | -5.235504E-03 | 2.850836E-02 |
| 62 | 0.000000E+00 | -1.851489E-02 | 3.038585E-03 | -5.861380E-03 | 7.831416E-03 |
| 71 | 0.000000E+00 | -2.172017E-02 | 1.120845E-02 | -6.677242E-03 | 2.759344E-03 |
| 72 | 0.000000E+00 | -6.717621E-02 | 2.421751E-02 | -1.030199E-02 | 3.886495E-03 |
| 81 | 0.000000E+00 | -4.127517E-02 | 1.084310E-02 | -4.875173E-03 | 1.530283E-03 |
| 82 | 0.000000E+00 | 2.629026E-02 | -6.842241E-03 | 5.873380E-04 | 3.551144E-05 |
| 91 | 0.000000E+00 | -3.183912E-02 | 5.827787E-03 | -6.435204E-04 | 7.574890E-05 |
| 92 | -6.627616E+00 | -1.861570E-02 | 3.359081E-03 | -3.854968E-04 | 2.552700E-05 |
| Surface | $a_{12}$ | $a_{14}$ | $a_{16}$ | $a_{18}$ | $a_{20}$ |
| 11 | 2.228474E-06 | -1.938926E-06 | 4.103489E-07 | | |
| 12 | -3.813577E-04 | 9.348826E-05 | -8.559719E-06 | | |
| 21 | -3.601477E-04 | 1.671479E-04 | -2.103503E-05 | | |
| 22 | 6.227327E-05 | 1.471262E-04 | -2.617405E-05 | | |
| 31 | 2.640061E-03 | -3.984265E-04 | 2.510130E-05 | | |
| 32 | 2.988350E-03 | -2.822017E-04 | 3.401872E-06 | | |
| 41 | -1.228817E-03 | 6.740316E-04 | -8.851746E-05 | | |
| 42 | -9.744561E-04 | 3.500307E-04 | -4.505706E-05 | | |
| 51 | 1.329451E-02 | -6.036919E-03 | 1.809952E-03 | -3.158125E-04 | 2.372895E-05 |
| 52 | -5.985621E-03 | 3.601571E-03 | -9.422165E-04 | 1.160041E-04 | -5.338843E-06 |
| 61 | -2.458607E-02 | 1.083735E-02 | -2.666737E-03 | 3.478550E-04 | -1.883723E-05 |
| 62 | -4.599473E-03 | 1.463796E-03 | -2.586035E-04 | 2.362989E-05 | -8.677878E-07 |
| 71 | -7.833779E-04 | 1.494371E-04 | -1.843891E-05 | 1.380657E-06 | -5.012940E-08 |
| 72 | -1.162162E-03 | 2.515829E-04 | -3.597965E-05 | 2.996290E-06 | -1.080227E-07 |
| 81 | -3.574922E-04 | 5.930888E-05 | -6.502740E-06 | 4.136903E-07 | -1.132431E-08 |
| 82 | -1.512010E-05 | 1.806140E-06 | -1.129983E-07 | 3.705970E-09 | -5.024300E-11 |
| 91 | -7.612358E-06 | 4.977836E-07 | -1.929714E-08 | 4.053440E-10 | -3.569000E-12 |
| 92 | -8.315960E-07 | 1.686669E-09 | 7.752400E-10 | -2.253900E-11 | 2.030000E-13 |

FIG. 9

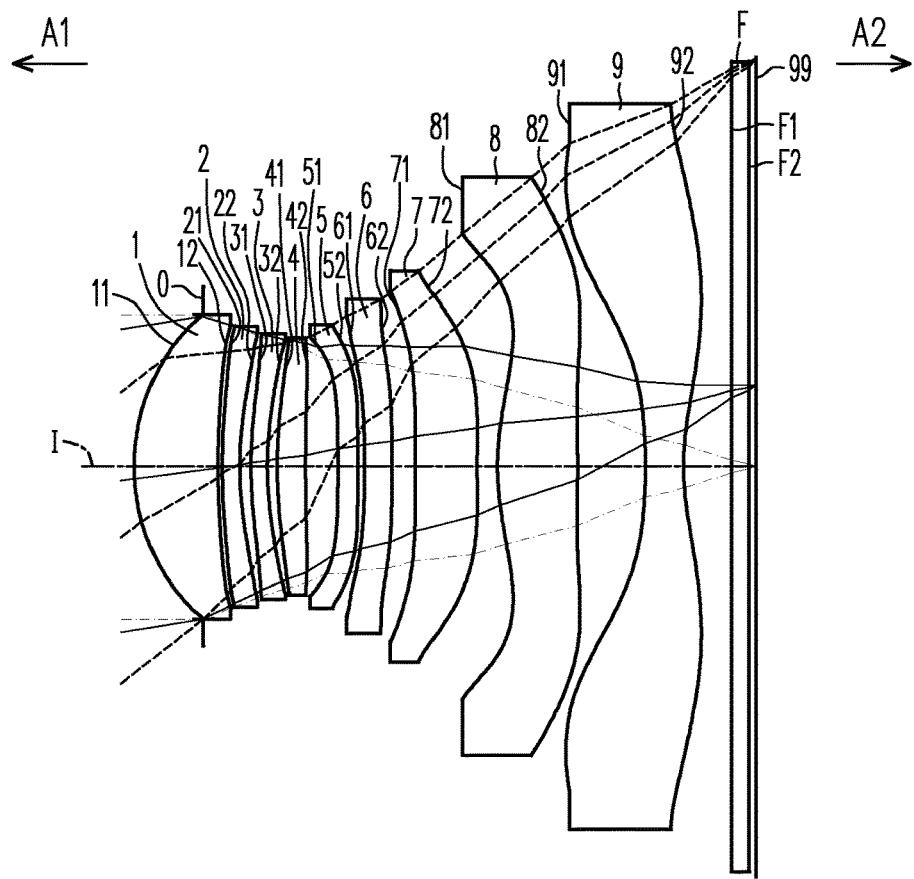
FIG. 10
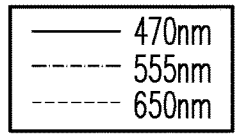
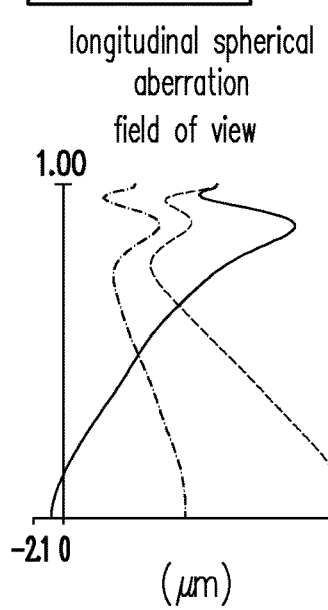
FIG. 11A
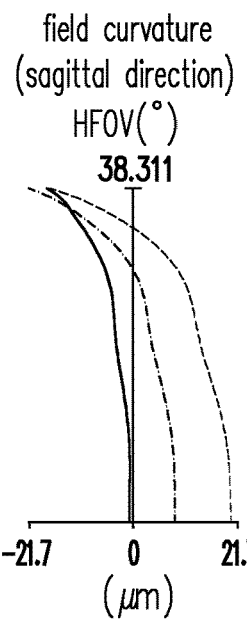
FIG. 11B
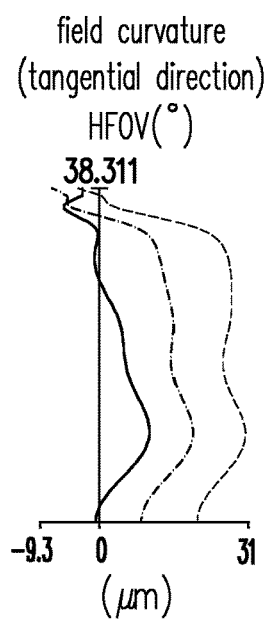
FIG. 11C
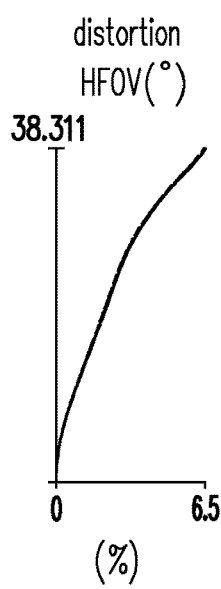
FIG. 11D

| Second embodiment | | | | | | |
|---|---|---|---|---|---|---|
| EFL = 5.960 mm, HFOV = 38.311°, TTL = 7.598 mm, Fno = 1.600, ImgH = 5.000 mm | | | | | | |
| Element | Surface | Radius of curvature (mm) | Thickness (mm) | Refractive index | Abbe number | Focal length (mm) |
| Object | | Infinity | Infinity | | | |
| Aperture 0 | | Infinity | -0.841 | | | |
| First lens element 1 | Object-side surface 11 | 2.608 | 1.021 | 1.545 | 55.987 | 5.931 |
| | Image-side surface 12 | 11.522 | 0.050 | | | |
| Second lens element 2 | Object-side surface 21 | 7.805 | 0.216 | 1.640 | 23.529 | -20.451 |
| | Image-side surface 22 | 4.849 | 0.137 | | | |
| Third lens element 3 | Object-side surface 31 | 6.147 | 0.201 | 1.671 | 19.243 | -35.532 |
| | Image-side surface 32 | 4.832 | 0.122 | | | |
| Fourth lens element 4 | Object-side surface 41 | 7.087 | 0.345 | 1.545 | 55.987 | 18.815 |
| | Image-side surface 42 | 22.437 | 0.400 | | | |
| Fifth lens element 5 | Object-side surface 51 | -23.628 | 0.244 | 1.671 | 19.243 | -432.514 |
| | Image-side surface 52 | -25.807 | 0.081 | | | |
| Sixth lens element 6 | Object-side surface 61 | -12.235 | 0.337 | 1.671 | 19.243 | -29.385 |
| | Image-side surface 62 | -32.093 | 0.285 | | | |
| Seventh lens element 7 | Object-side surface 71 | 335.405 | 0.748 | 1.545 | 55.987 | -37.285 |
| | Image-side surface 72 | 19.187 | 0.251 | | | |
| Eighth lens element 8 | Object-side surface 81 | 3.321 | 0.984 | 1.545 | 55.987 | 5.170 |
| | Image-side surface 82 | -16.911 | 0.828 | | | |
| Ninth lens element 9 | Object-side surface 91 | -8.730 | 0.467 | 1.545 | 55.987 | -4.105 |
| | Image-side surface 92 | 3.075 | 0.582 | | | |
| Filter F | Object-side surface F1 | Infinity | 0.210 | 1.517 | 64.167 | |
| | Image-side surface F2 | Infinity | 0.089 | | | |
| | Image plane 99 | Infinity | | | | |

FIG. 12

| Surface | K | $a_4$ | $a_6$ | $a_8$ | $a_{10}$ |
|---|---|---|---|---|---|
| 11 | 0.000000E+00 | 1.284529E-03 | 8.502522E-05 | 9.260953E-04 | -7.930247E-04 |
| 12 | 0.000000E+00 | -5.808469E-03 | 5.308415E-03 | -6.573882E-03 | 5.964440E-03 |
| 21 | 0.000000E+00 | -5.106479E-03 | -1.075157E-02 | 5.390800E-03 | 1.266016E-03 |
| 22 | 6.364741E-01 | 1.934445E-02 | -5.357231E-02 | 4.776861E-02 | -2.759205E-02 |
| 31 | -2.465777E+00 | 3.267812E-02 | -1.002833E-01 | 1.115326E-01 | -7.404182E-02 |
| 32 | 9.765057E-01 | 3.396984E-02 | -1.102996E-01 | 1.246957E-01 | -7.905759E-02 |
| 41 | 0.000000E+00 | 2.891507E-02 | -5.662328E-02 | 4.401591E-02 | -1.691623E-02 |
| 42 | 0.000000E+00 | 5.522043E-03 | -1.250331E-02 | 7.318578E-04 | 5.395770E-03 |
| 51 | 0.000000E+00 | -9.398073E-03 | -2.464874E-02 | 3.816062E-03 | 9.065196E-03 |
| 52 | 0.000000E+00 | 2.468212E-02 | -6.505105E-02 | 3.241343E-02 | -4.804768E-03 |
| 61 | 0.000000E+00 | 1.902112E-02 | -5.314295E-02 | 2.350850E-02 | 6.291837E-03 |
| 62 | 0.000000E+00 | -1.289961E-02 | -1.107270E-02 | 3.512674E-03 | 4.695200E-03 |
| 71 | 0.000000E+00 | -2.630051E-02 | 1.399900E-02 | -1.472004E-02 | 1.015439E-02 |
| 72 | 0.000000E+00 | -7.630353E-02 | 2.704409E-02 | -1.125795E-02 | 4.121013E-03 |
| 81 | 0.000000E+00 | -4.052856E-02 | 7.187112E-03 | -3.006828E-03 | 6.575290E-04 |
| 82 | 0.000000E+00 | 3.909167E-02 | -1.319715E-02 | 1.670698E-03 | 1.043706E-05 |
| 91 | 0.000000E+00 | -3.575768E-02 | 7.481757E-03 | -1.038389E-03 | 1.530439E-04 |
| 92 | -9.271882E+00 | -2.388853E-02 | 5.118457E-03 | -8.642072E-04 | 1.032642E-04 |
| Surface | $a_{12}$ | $a_{14}$ | $a_{16}$ | $a_{18}$ | $a_{20}$ |
| 11 | 3.863140E-04 | -9.260771E-05 | 9.312395E-06 | | |
| 12 | -2.752192E-03 | 6.406180E-04 | -5.766170E-05 | | |
| 21 | -1.731670E-03 | 5.581972E-04 | -6.138423E-05 | | |
| 22 | 9.939803E-03 | -1.927879E-03 | 1.501225E-04 | | |
| 31 | 2.912354E-02 | -6.199347E-03 | 5.491705E-04 | | |
| 32 | 2.887766E-02 | -5.639061E-03 | 4.618143E-04 | | |
| 41 | 7.597203E-04 | 1.351078E-03 | -2.604024E-04 | | |
| 42 | -4.720236E-03 | 1.731747E-03 | -2.290254E-04 | | |
| 51 | -1.148334E-02 | 5.923569E-03 | -1.409851E-03 | 9.868072E-05 | 9.296231E-06 |
| 52 | -4.374395E-03 | 2.979419E-03 | -7.347501E-04 | 6.144298E-05 | 1.821071E-06 |
| 61 | -1.111155E-02 | 5.687076E-03 | -1.569422E-03 | 2.327710E-04 | -1.465022E-05 |
| 62 | -3.908966E-03 | 1.423286E-03 | -2.859204E-04 | 3.038575E-05 | -1.340649E-06 |
| 71 | -4.655965E-03 | 1.427096E-03 | -2.767334E-04 | 3.057499E-05 | -1.472080E-06 |
| 72 | -1.169753E-03 | 2.370559E-04 | -3.123207E-05 | 2.413248E-06 | -8.415503E-08 |
| 81 | -5.644573E-05 | -5.027206E-06 | 1.479958E-06 | -1.067633E-07 | 2.352944E-09 |
| 82 | -3.702300E-05 | 5.859179E-06 | -4.466272E-07 | 1.730142E-08 | -2.722100E-10 |
| 91 | -1.794770E-05 | 1.344972E-06 | -5.998345E-08 | 1.459251E-09 | -1.496100E-11 |
| 92 | -8.224245E-06 | 4.257658E-07 | -1.378720E-08 | 2.551490E-10 | -2.076000E-12 |

FIG. 13

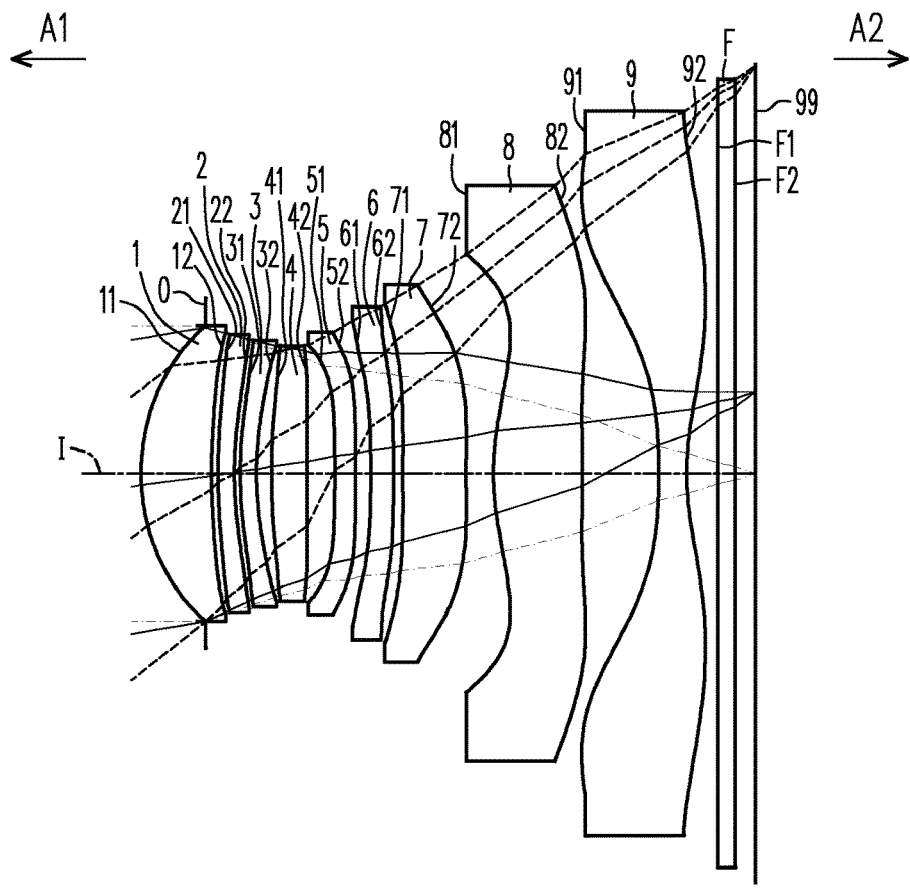
FIG. 14
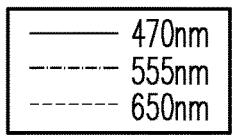
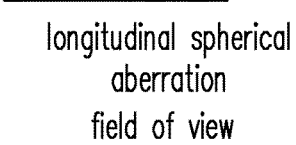 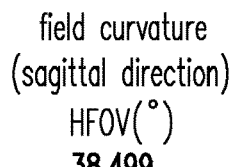 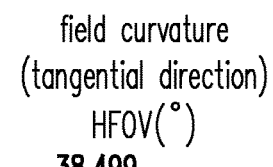 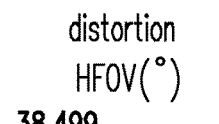
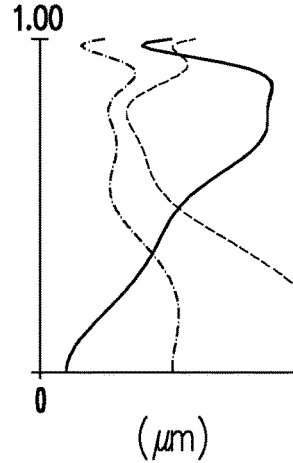 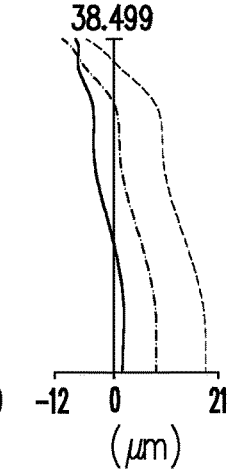 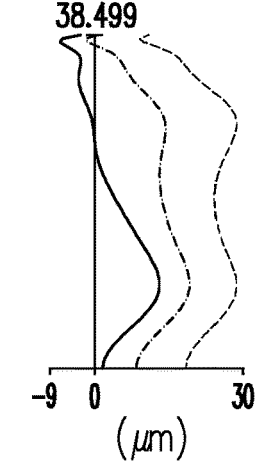 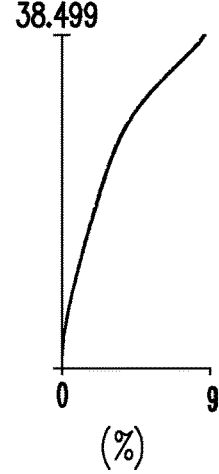
FIG.15A    FIG.15B    FIG.15C    FIG.15D

| Third embodiment ||||||
|---|---|---|---|---|---|
| EFL = 5.801 mm, HFOV = 38.499°, TTL = 7.513 mm, Fno = 1.600, ImgH = 5.000 mm ||||||
| Element | Surface | Radius of curvature (mm) | Thickness (mm) | Refractive index | Abbe number | Focal length (mm) |
| Object | | Infinity | Infinity | | | |
| Aperture 0 | | Infinity | -0.785 | | | |
| First lens element 1 | Object-side surface 11 | 2.621 | 0.858 | 1.545 | 55.987 | 6.302 |
| | Image-side surface 12 | 9.719 | 0.077 | | | |
| Second lens element 2 | Object-side surface 21 | 7.826 | 0.202 | 1.671 | 19.243 | -27.525 |
| | Image-side surface 22 | 5.455 | 0.070 | | | |
| Third lens element 3 | Object-side surface 31 | 5.551 | 0.200 | 1.671 | 19.243 | -41.630 |
| | Image-side surface 32 | 4.571 | 0.184 | | | |
| Fourth lens element 4 | Object-side surface 41 | 8.999 | 0.435 | 1.545 | 55.987 | 19.197 |
| | Image-side surface 42 | 62.349 | 0.343 | | | |
| Fifth lens element 5 | Object-side surface 51 | -26.503 | 0.251 | 1.671 | 19.243 | -74.800 |
| | Image-side surface 52 | -55.767 | 0.190 | | | |
| Sixth lens element 6 | Object-side surface 61 | -12.979 | 0.278 | 1.671 | 19.243 | -32.476 |
| | Image-side surface 62 | -31.918 | 0.115 | | | |
| Seventh lens element 7 | Object-side surface 71 | 61.600 | 0.770 | 1.545 | 55.987 | -49.868 |
| | Image-side surface 72 | 18.805 | 0.335 | | | |
| Eighth lens element 8 | Object-side surface 81 | 3.339 | 1.090 | 1.545 | 55.987 | 5.282 |
| | Image-side surface 82 | -18.787 | 0.936 | | | |
| Ninth lens element 9 | Object-side surface 91 | -9.086 | 0.342 | 1.545 | 55.987 | -4.192 |
| | Image-side surface 92 | 3.103 | 0.382 | | | |
| Filter F | Object-side surface F1 | Infinity | 0.210 | 1.517 | 64.167 | |
| | Image-side surface F2 | Infinity | 0.245 | | | |
| | Image plane 99 | Infinity | | | | |

FIG. 16

| Surface | K | $a_4$ | $a_6$ | $a_8$ | $a_{10}$ |
|---|---|---|---|---|---|
| 11 | 0.000000E+00 | 1.489354E-03 | 6.974709E-04 | 1.423749E-05 | -1.334525E-04 |
| 12 | 0.000000E+00 | -4.450632E-03 | 2.064392E-03 | -2.558399E-03 | 2.829489E-03 |
| 21 | 0.000000E+00 | -6.573849E-03 | -7.050838E-03 | 5.094972E-03 | -1.664637E-03 |
| 22 | 5.136224E-01 | 2.111368E-02 | -6.411035E-02 | 6.888247E-02 | -4.842705E-02 |
| 31 | -1.932439E+00 | 3.546838E-02 | -1.068794E-01 | 1.230655E-01 | -8.538929E-02 |
| 32 | 1.278607E+00 | 2.221684E-02 | -7.423488E-02 | 8.116633E-02 | -5.082340E-02 |
| 41 | 0.000000E+00 | 1.668301E-02 | -3.002828E-02 | 1.758111E-02 | -5.050896E-03 |
| 42 | 0.000000E+00 | 6.227149E-03 | -1.647478E-02 | 8.232002E-03 | -3.914104E-03 |
| 51 | 0.000000E+00 | -2.496751E-03 | -3.835465E-02 | 2.702976E-02 | -1.771126E-02 |
| 52 | 0.000000E+00 | 1.639368E-02 | -6.593764E-02 | 6.316122E-02 | -4.921313E-02 |
| 61 | 0.000000E+00 | 2.357540E-02 | -7.394770E-02 | 5.736220E-02 | -2.014189E-02 |
| 62 | 0.000000E+00 | 7.089678E-03 | -4.680488E-02 | 3.035065E-02 | -5.312658E-03 |
| 71 | 0.000000E+00 | -2.929097E-02 | 1.590535E-02 | -1.913607E-02 | 1.713740E-02 |
| 72 | 0.000000E+00 | -7.989735E-02 | 3.818839E-02 | -1.982699E-02 | 8.805234E-03 |
| 81 | 0.000000E+00 | -4.126402E-02 | 1.067760E-02 | -5.084940E-03 | 1.586359E-03 |
| 82 | 0.000000E+00 | 3.438968E-02 | -1.094491E-02 | 1.627734E-03 | -1.404441E-04 |
| 91 | 0.000000E+00 | -3.505225E-02 | 7.761865E-03 | -1.182417E-03 | 1.740319E-04 |
| 92 | -7.712228E+00 | -2.675326E-02 | 6.303661E-03 | -1.109902E-03 | 1.345345E-04 |
| Surface | $a_{12}$ | $a_{14}$ | $a_{16}$ | $a_{18}$ | $a_{20}$ |
| 11 | 1.550282E-04 | -5.489845E-05 | 7.529925E-06 | | |
| 12 | -1.406050E-03 | 3.554737E-04 | -3.478512E-05 | | |
| 21 | 3.939255E-04 | -2.662752E-05 | -4.499029E-06 | | |
| 22 | 2.044881E-02 | -4.536471E-03 | 4.036556E-04 | | |
| 31 | 3.489124E-02 | -7.603795E-03 | 6.783328E-04 | | |
| 32 | 1.854205E-02 | -3.614933E-03 | 2.941376E-04 | | |
| 41 | -4.655177E-04 | 7.072473E-04 | -1.116923E-04 | | |
| 42 | 1.588023E-03 | -3.486232E-04 | 3.428950E-05 | | |
| 51 | 6.170477E-03 | -1.932357E-04 | -6.259547E-04 | 2.014331E-04 | -2.029403E-05 |
| 52 | 2.773350E-02 | -1.098332E-02 | 2.973515E-03 | -4.894384E-04 | 3.646277E-05 |
| 61 | -1.805040E-04 | 3.266872E-03 | -1.312421E-03 | 2.251920E-04 | -1.492676E-05 |
| 62 | -2.822355E-03 | 1.980126E-03 | -5.289030E-04 | 6.869078E-05 | -3.590256E-06 |
| 71 | -9.333058E-03 | 3.095321E-03 | -6.163293E-04 | 6.817348E-05 | -3.234491E-06 |
| 72 | -2.996467E-03 | 7.163465E-04 | -1.112699E-04 | 1.003837E-05 | -3.961640E-07 |
| 81 | -3.562491E-04 | 5.516918E-05 | -5.632101E-06 | 3.473559E-07 | -9.753229E-09 |
| 82 | 4.488912E-06 | 4.640646E-07 | -5.851277E-08 | 2.374154E-09 | -3.164600E-11 |
| 91 | -1.923153E-05 | 1.362832E-06 | -5.831008E-08 | 1.379025E-09 | -1.389800E-11 |
| 92 | -1.074683E-05 | 5.551275E-07 | -1.789407E-08 | 3.291420E-10 | -2.657000E-12 |

FIG. 17

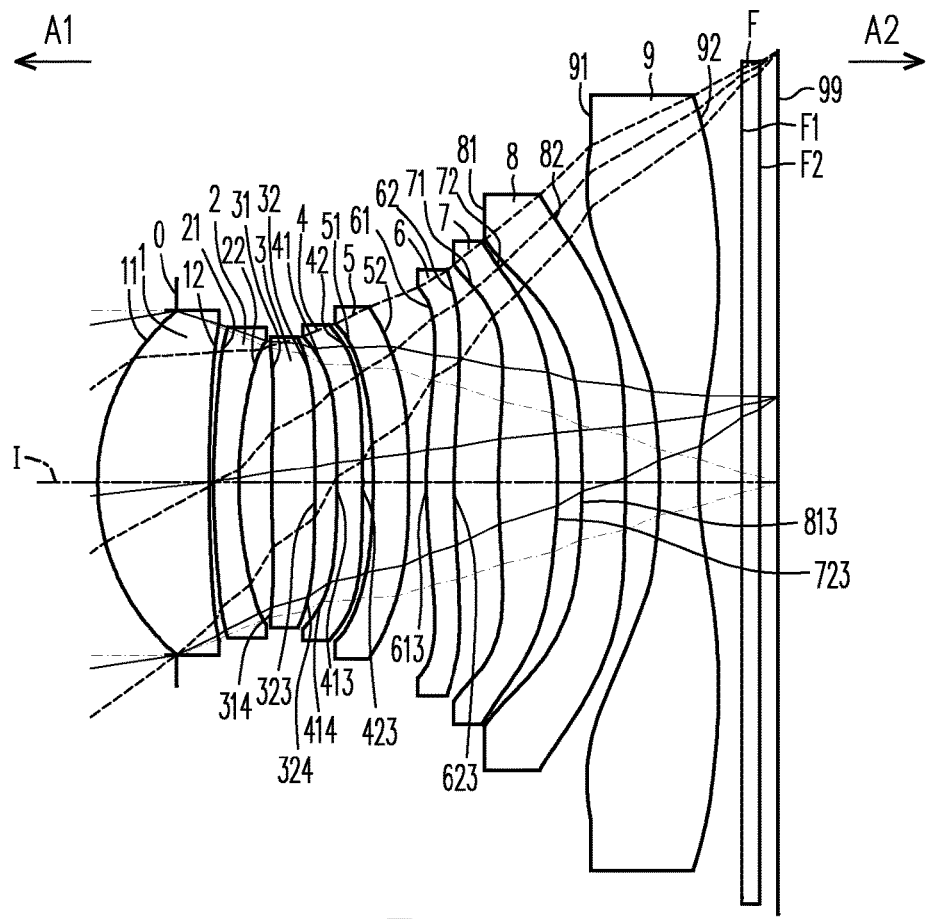
FIG. 18
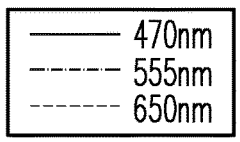
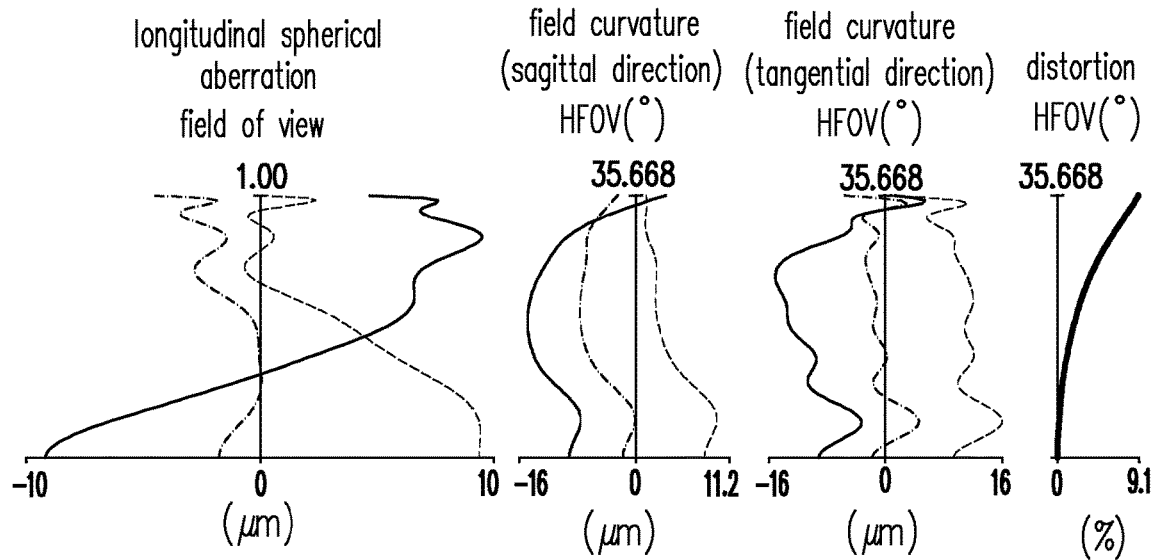
FIG.19A  FIG.19B  FIG.19C  FIG.19D

| Fourth embodiment | | | | | | |
|---|---|---|---|---|---|---|
| EFL = 6.388 mm, HFOV = 35.668°, TTL = 7.888 mm, Fno = 1.600, ImgH = 5.000 mm | | | | | | |
| Element | Surface | Radius of curvature (mm) | Thickness (mm) | Refractive index | Abbe number | Focal length (mm) |
| Object | | Infinity | Infinity | | | |
| Aperture 0 | | Infinity | -0.921 | | | |
| First lens element 1 | Object-side surface 11 | 2.702 | 1.295 | 1.545 | 55.987 | 5.798 |
| | Image-side surface 12 | 15.297 | 0.050 | | | |
| Second lens element 2 | Object-side surface 21 | 7.656 | 0.293 | 1.671 | 19.243 | -15.801 |
| | Image-side surface 22 | 4.395 | 0.381 | | | |
| Third lens element 3 | Object-side surface 31 | 16.109 | 0.498 | 1.535 | 55.690 | 26.779 |
| | Image-side surface 32 | -132.752 | 0.255 | | | |
| Fourth lens element 4 | Object-side surface 41 | -18.569 | 0.298 | 1.671 | 19.243 | 155.457 |
| | Image-side surface 42 | -15.888 | 0.124 | | | |
| Fifth lens element 5 | Object-side surface 51 | -6.137 | 0.409 | 1.671 | 19.243 | -25.765 |
| | Image-side surface 52 | -9.719 | 0.202 | | | |
| Sixth lens element 6 | Object-side surface 61 | 6.348 | 0.329 | 1.615 | 25.920 | 58.358 |
| | Image-side surface 62 | 7.548 | 0.516 | | | |
| Seventh lens element 7 | Object-side surface 71 | 10.520 | 0.682 | 1.545 | 55.987 | 6.149 |
| | Image-side surface 72 | -4.822 | 0.282 | | | |
| Eighth lens element 8 | Object-side surface 81 | -6.687 | 0.503 | 1.640 | 23.529 | -33.405 |
| | Image-side surface 82 | -9.984 | 0.388 | | | |
| Ninth lens element 9 | Object-side surface 91 | -6.200 | 0.456 | 1.545 | 55.987 | -4.166 |
| | Image-side surface 92 | 3.688 | 0.500 | | | |
| Filter F | Object-side surface F1 | Infinity | 0.210 | 1.517 | 64.167 | |
| | Image-side surface F2 | Infinity | 0.216 | | | |
| | Image plane 99 | Infinity | | | | |

FIG. 20

| Surface | K | $a_4$ | $a_6$ | $a_8$ | $a_{10}$ |
|---|---|---|---|---|---|
| 11 | 1.699505E-01 | -2.043481E-04 | 1.375721E-04 | -1.159258E-04 | 8.276959E-05 |
| 12 | 0.000000E+00 | -1.458281E-02 | 1.421541E-02 | -8.301209E-03 | 3.365120E-03 |
| 21 | 1.215836E+01 | -3.236579E-02 | 1.642057E-02 | -7.997276E-03 | 3.195354E-03 |
| 22 | -1.894878E+00 | -1.410984E-02 | 4.305028E-03 | 9.480291E-04 | -1.597572E-03 |
| 31 | 0.000000E+00 | -1.215883E-02 | -4.107205E-03 | 1.827151E-03 | -1.555837E-03 |
| 32 | 0.000000E+00 | -1.724712E-02 | -6.387035E-03 | 3.958097E-03 | -2.839560E-03 |
| 41 | 0.000000E+00 | -1.579564E-02 | -1.717181E-02 | 1.302419E-02 | -9.209518E-03 |
| 42 | 0.000000E+00 | 2.462408E-02 | -5.260415E-02 | 3.679276E-02 | -1.717064E-02 |
| 51 | 0.000000E+00 | 5.016679E-02 | -8.936440E-02 | 7.241930E-02 | -4.292268E-02 |
| 52 | 0.000000E+00 | 2.076936E-02 | -5.968298E-02 | 4.566311E-02 | -2.363119E-02 |
| 61 | 0.000000E+00 | -1.647936E-02 | -2.540880E-03 | 2.941583E-03 | -1.511279E-03 |
| 62 | 0.000000E+00 | -3.467248E-02 | 1.781722E-02 | -9.658104E-03 | 4.289523E-03 |
| 71 | 0.000000E+00 | -2.941369E-03 | -4.340116E-03 | -3.670472E-03 | 3.560619E-03 |
| 72 | -8.077876E+00 | 5.255680E-02 | -3.826427E-02 | 1.218213E-02 | -2.195530E-03 |
| 81 | 0.000000E+00 | 6.237786E-02 | -6.360214E-02 | 2.551488E-02 | -5.577411E-03 |
| 82 | 0.000000E+00 | 5.792303E-02 | -5.028265E-02 | 1.939996E-02 | -4.456752E-03 |
| 91 | 0.000000E+00 | 1.142893E-02 | -1.303857E-02 | 4.090177E-03 | -6.410568E-04 |
| 92 | -1.041399E+01 | -1.764259E-02 | 3.534770E-03 | -5.707593E-04 | 7.043956E-05 |
| Surface | $a_{12}$ | $a_{14}$ | $a_{16}$ | $a_{18}$ | $a_{20}$ |
| 11 | -2.636711E-05 | 4.222204E-06 | -2.661395E-07 | | |
| 12 | -8.468795E-04 | 1.204851E-04 | -7.157899E-06 | | |
| 21 | -8.171315E-04 | 1.236898E-04 | -8.588508E-06 | | |
| 22 | 1.176071E-03 | -3.685415E-04 | 5.027751E-05 | | |
| 31 | 1.079595E-03 | -3.002169E-04 | 3.224232E-05 | | |
| 32 | 1.549342E-03 | -4.132336E-04 | 3.964188E-05 | | |
| 41 | 3.564164E-03 | -7.245286E-04 | 6.604882E-05 | | |
| 42 | 4.562122E-03 | -7.273798E-04 | 1.255699E-04 | | |
| 51 | 2.078626E-02 | -7.901980E-03 | 2.089810E-03 | -3.308069E-04 | 2.302645E-05 |
| 52 | 9.120840E-03 | -2.437641E-03 | 4.136771E-04 | -4.101336E-05 | 1.894796E-06 |
| 61 | 5.831595E-04 | -1.747092E-04 | 3.287870E-05 | -3.319415E-06 | 1.346738E-07 |
| 62 | -1.373366E-03 | 2.886933E-04 | -3.859081E-05 | 3.047967E-06 | -1.085839E-07 |
| 71 | -1.580497E-03 | 4.245250E-04 | -6.977013E-05 | 6.366342E-06 | -2.432067E-07 |
| 72 | 1.964054E-04 | -5.274475E-06 | 1.874773E-07 | -8.404163E-08 | 5.279404E-09 |
| 81 | 6.736667E-04 | -4.449513E-05 | 2.000951E-06 | -1.162876E-07 | 4.721571E-09 |
| 82 | 6.459911E-04 | -5.949017E-05 | 3.374552E-06 | -1.073956E-07 | 1.464290E-09 |
| 91 | 6.057403E-05 | -3.643205E-06 | 1.377979E-07 | -3.008431E-09 | 2.901400E-11 |
| 92 | -6.101968E-06 | 3.510540E-07 | -1.273084E-08 | 2.637280E-10 | -2.385000E-12 |

FIG. 21

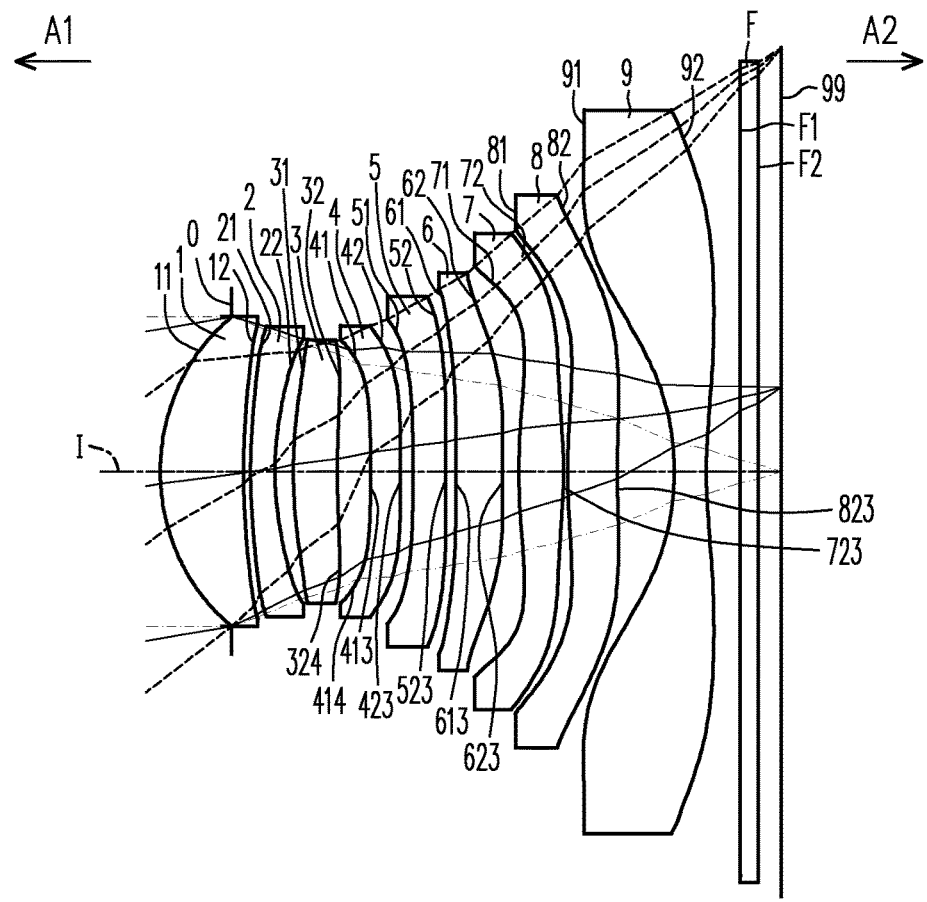
FIG. 22
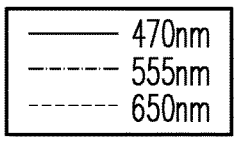
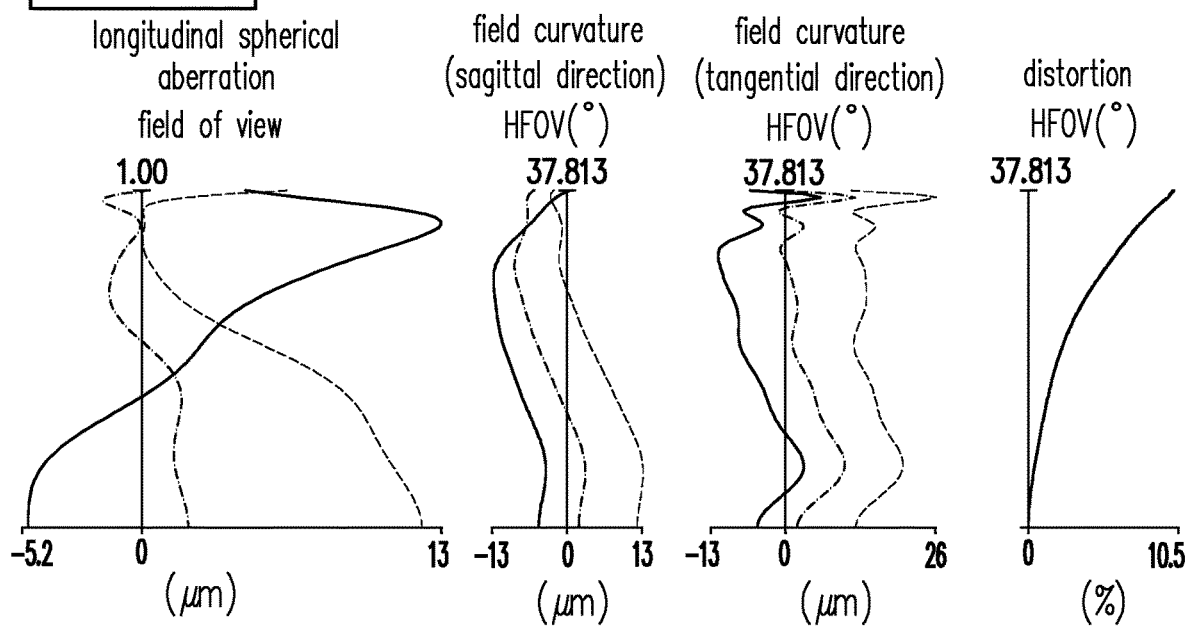
FIG.23A  FIG.23B  FIG.23C  FIG.23D

| Fifth embodiment |||||||
|---|---|---|---|---|---|---|
| EFL = 5.854 mm, HFOV = 37.813°, TTL = 7.328 mm, Fno = 1.600, ImgH = 5.000 mm |||||||
| Element | Surface | Radius of curvature (mm) | Thickness (mm) | Refractive index | Abbe number | Focal length (mm) |
| Object | | Infinity | Infinity | | | |
| Aperture 0 | | Infinity | -0.839 | | | |
| First lens element 1 | Object-side surface 11 | 2.475 | 0.984 | 1.545 | 55.987 | 5.853 |
| | Image-side surface 12 | 9.423 | 0.081 | | | |
| Second lens element 2 | Object-side surface 21 | 6.725 | 0.290 | 1.661 | 20.373 | -13.520 |
| | Image-side surface 22 | 3.786 | 0.215 | | | |
| Third lens element 3 | Object-side surface 31 | 5.534 | 0.521 | 1.545 | 55.987 | 16.849 |
| | Image-side surface 32 | 13.413 | 0.390 | | | |
| Fourth lens element 4 | Object-side surface 41 | -41.000 | 0.351 | 1.661 | 20.373 | -87.064 |
| | Image-side surface 42 | -139.885 | 0.149 | | | |
| Fifth lens element 5 | Object-side surface 51 | -39.165 | 0.386 | 1.661 | 20.373 | -26.487 |
| | Image-side surface 52 | 32.323 | 0.122 | | | |
| Sixth lens element 6 | Object-side surface 61 | 48.598 | 0.547 | 1.535 | 55.690 | -36.815 |
| | Image-side surface 62 | 13.999 | 0.195 | | | |
| Seventh lens element 7 | Object-side surface 71 | 7.061 | 0.528 | 1.545 | 55.987 | 5.762 |
| | Image-side surface 72 | -5.529 | 0.050 | | | |
| Eighth lens element 8 | Object-side surface 81 | 7.458 | 0.585 | 1.567 | 37.533 | 39.029 |
| | Image-side surface 82 | 10.902 | 0.671 | | | |
| Ninth lens element 9 | Object-side surface 91 | -3.438 | 0.382 | 1.535 | 55.690 | -4.083 |
| | Image-side surface 92 | 6.289 | 0.400 | | | |
| Filter F | Object-side surface F1 | Infinity | 0.210 | 1.517 | 64.167 | |
| | Image-side surface F2 | Infinity | 0.271 | | | |
| | Image plane 99 | Infinity | | | | |

FIG. 24

| Surface | K | $a_4$ | $a_6$ | $a_8$ | $a_{10}$ |
|---|---|---|---|---|---|
| 11 | 2.135153E-01 | -2.040535E-04 | -2.723486E-04 | 3.832862E-04 | -2.743902E-04 |
| 12 | 0.000000E+00 | -4.176243E-03 | -1.540229E-03 | 3.724246E-03 | -2.131228E-03 |
| 21 | 9.662861E+00 | -2.228505E-02 | -2.609139E-03 | 8.272877E-03 | -4.798905E-03 |
| 22 | -3.424206E+00 | -4.626421E-03 | -4.935472E-03 | 8.651651E-03 | -4.970523E-03 |
| 31 | 0.000000E+00 | -2.286934E-03 | -7.756687E-03 | 3.105083E-03 | -2.077417E-03 |
| 32 | 0.000000E+00 | -7.524584E-03 | -2.932509E-03 | -4.925122E-03 | 5.384962E-03 |
| 41 | 0.000000E+00 | -3.050575E-02 | -1.811415E-02 | 1.508648E-02 | -1.540531E-02 |
| 42 | 0.000000E+00 | -1.584680E-02 | -4.529796E-02 | 6.180897E-02 | -6.420912E-02 |
| 51 | 0.000000E+00 | -4.058750E-03 | -4.466089E-02 | 5.547894E-02 | -4.347372E-02 |
| 52 | 0.000000E+00 | -1.953314E-02 | -1.401026E-02 | 2.268702E-02 | -1.912258E-02 |
| 61 | 0.000000E+00 | -4.853586E-02 | 2.850374E-02 | -4.437847E-03 | -8.277779E-03 |
| 62 | 0.000000E+00 | -8.561114E-02 | 1.398721E-02 | 1.796205E-02 | -1.598040E-02 |
| 71 | 2.254577E+00 | -1.715073E-03 | -3.536105E-02 | 3.112739E-02 | -1.602119E-02 |
| 72 | -1.278955E+00 | 5.786690E-02 | -2.094264E-02 | 2.784118E-03 | 3.418081E-05 |
| 81 | 0.000000E+00 | -3.471605E-02 | 1.495056E-02 | -6.063311E-03 | 5.062701E-04 |
| 82 | 0.000000E+00 | -4.595528E-02 | 2.005079E-02 | -7.587168E-03 | 1.744524E-03 |
| 91 | -4.375548E-01 | -3.017175E-02 | 1.257911E-02 | -2.764136E-03 | 4.981065E-04 |
| 92 | -3.732469E+01 | -1.627146E-02 | 4.153149E-03 | -7.167729E-04 | 8.371402E-05 |
| Surface | $a_{12}$ | $a_{14}$ | $a_{16}$ | $a_{18}$ | $a_{20}$ |
| 11 | 1.065850E-04 | -1.917890E-05 | 5.665770E-07 | | |
| 12 | 6.201328E-04 | -9.617106E-05 | 8.279358E-06 | | |
| 21 | 1.428386E-03 | -2.011790E-04 | 1.190767E-05 | | |
| 22 | 1.903407E-03 | -4.117324E-04 | 6.057010E-05 | | |
| 31 | 1.008118E-03 | -2.266963E-04 | 3.832078E-05 | | |
| 32 | -3.608147E-03 | 1.334703E-03 | -1.954702E-04 | | |
| 41 | 8.386676E-03 | -2.167750E-03 | 2.066330E-04 | | |
| 42 | 4.516519E-02 | -2.079589E-02 | 6.066430E-03 | | |
| 51 | 2.386146E-02 | -8.964540E-03 | 2.115764E-03 | -2.774518E-04 | 1.514007E-05 |
| 52 | 1.111465E-02 | -4.226050E-03 | 9.724636E-04 | -1.220486E-04 | 6.403038E-06 |
| 61 | 7.375017E-03 | -2.920930E-03 | 6.304652E-04 | -7.193040E-05 | 3.397916E-06 |
| 62 | 6.410075E-03 | -1.481491E-03 | 2.027641E-04 | -1.530054E-05 | 4.909412E-07 |
| 71 | 5.112418E-03 | -1.036660E-03 | 1.268775E-04 | -8.292156E-06 | 2.159932E-07 |
| 72 | -6.254000E-06 | -2.268385E-05 | 5.956986E-06 | -5.806365E-07 | 2.028063E-08 |
| 81 | 3.184943E-04 | -1.045898E-04 | 1.365231E-05 | -8.470605E-07 | 2.063007E-08 |
| 82 | -2.410118E-04 | 2.035992E-05 | -1.036391E-06 | 2.964819E-08 | -3.773080E-10 |
| 91 | -6.385573E-05 | 5.277238E-06 | -2.656211E-07 | 7.417406E-09 | -8.826400E-11 |
| 92 | -6.789979E-06 | 3.685934E-07 | -1.247938E-08 | 2.361700E-10 | -1.927000E-12 |

FIG. 25

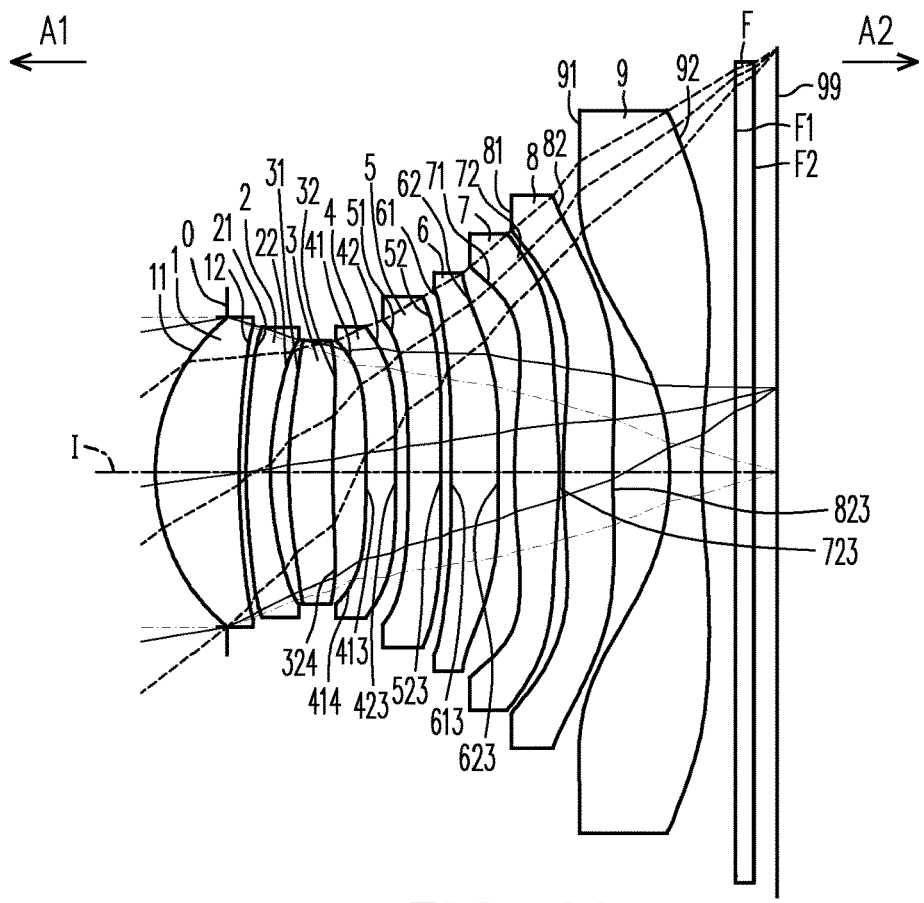
FIG. 26
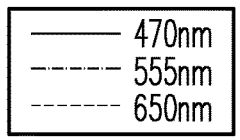
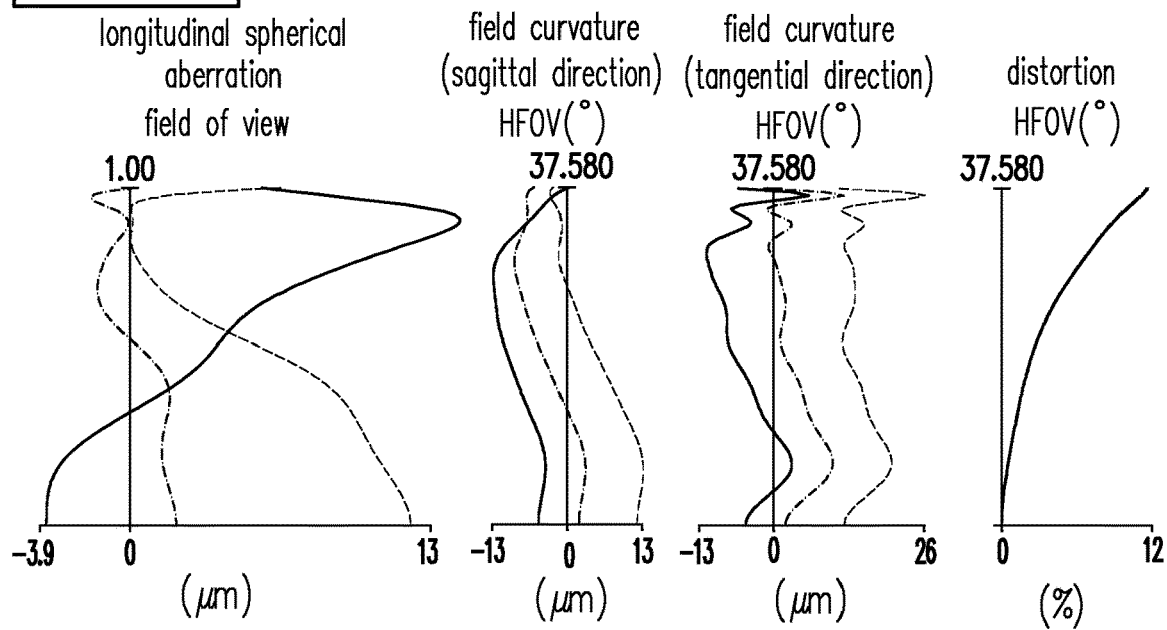
FIG.27A  FIG.27B  FIG.27C  FIG.27D

| Sixth embodiment |||||||
|---|---|---|---|---|---|---|
| EFL = 5.836 mm, HFOV = 37.580°, TTL = 7.313 mm, Fno = 1.600, ImgH = 5.000 mm |||||||
| Element | Surface | Radius of curvature (mm) | Thickness (mm) | Refractive index | Abbe number | Focal length (mm) |
| Object | | Infinity | Infinity | | | |
| Aperture 0 | | Infinity | -0.831 | | | |
| First lens element 1 | Object-side surface 11 | 2.477 | 1.004 | 1.545 | 55.987 | 5.841 |
| | Image-side surface 12 | 9.490 | 0.075 | | | |
| Second lens element 2 | Object-side surface 21 | 6.761 | 0.297 | 1.661 | 20.373 | -13.135 |
| | Image-side surface 22 | 3.749 | 0.214 | | | |
| Third lens element 3 | Object-side surface 31 | 5.518 | 0.539 | 1.545 | 55.987 | 16.096 |
| | Image-side surface 32 | 14.303 | 0.418 | | | |
| Fourth lens element 4 | Object-side surface 41 | -29.244 | 0.365 | 1.661 | 20.373 | -91.128 |
| | Image-side surface 42 | -56.634 | 0.187 | | | |
| Fifth lens element 5 | Object-side surface 51 | -24.449 | 0.352 | 1.661 | 20.373 | -26.571 |
| | Image-side surface 52 | 64.833 | 0.122 | | | |
| Sixth lens element 6 | Object-side surface 61 | 106.839 | 0.501 | 1.535 | 55.690 | -43.453 |
| | Image-side surface 62 | 19.122 | 0.190 | | | |
| Seventh lens element 7 | Object-side surface 71 | 7.404 | 0.532 | 1.545 | 55.987 | 5.727 |
| | Image-side surface 72 | -5.281 | 0.050 | | | |
| Eighth lens element 8 | Object-side surface 81 | 8.478 | 0.619 | 1.567 | 37.533 | 69.285 |
| | Image-side surface 82 | 10.510 | 0.677 | | | |
| Ninth lens element 9 | Object-side surface 91 | -3.538 | 0.318 | 1.535 | 55.690 | -4.139 |
| | Image-side surface 92 | 6.167 | 0.400 | | | |
| Filter F | Object-side surface F1 | Infinity | 0.210 | 1.517 | 64.167 | |
| | Image-side surface F2 | Infinity | 0.245 | | | |
| | Image plane 99 | Infinity | | | | |

FIG. 28

| Surface | K | $a_4$ | $a_6$ | $a_8$ | $a_{10}$ |
|---|---|---|---|---|---|
| 11 | 2.122728E-01 | -2.058649E-04 | -1.430730E-04 | 1.457379E-04 | -5.714435E-05 |
| 12 | 0.000000E+00 | -6.235072E-03 | 2.147582E-03 | 9.981463E-04 | -1.038509E-03 |
| 21 | 9.666330E+00 | -2.595610E-02 | 3.356794E-03 | 3.860331E-03 | -3.052571E-03 |
| 22 | -3.396034E+00 | -7.588391E-03 | -2.112115E-04 | 4.608244E-03 | -2.448793E-03 |
| 31 | 0.000000E+00 | -3.620646E-03 | -6.062457E-03 | 1.667301E-03 | -7.601311E-04 |
| 32 | 0.000000E+00 | -7.765198E-03 | -2.343031E-03 | -5.753689E-03 | 6.451683E-03 |
| 41 | 0.000000E+00 | -3.219432E-02 | -1.693883E-02 | 1.249392E-02 | -1.201007E-02 |
| 42 | 0.000000E+00 | -1.924275E-02 | -3.488925E-02 | 4.149666E-02 | -4.071741E-02 |
| 51 | 0.000000E+00 | -4.703038E-03 | -3.916171E-02 | 4.198588E-02 | -2.912609E-02 |
| 52 | 0.000000E+00 | -1.599358E-02 | -1.979719E-02 | 2.333979E-02 | -1.531936E-02 |
| 61 | 0.000000E+00 | -4.501236E-02 | 2.104398E-02 | -8.837801E-04 | -6.356765E-03 |
| 62 | 0.000000E+00 | -8.106942E-02 | 7.717073E-03 | 2.126283E-02 | -1.603618E-02 |
| 71 | 1.498240E+00 | 8.662243E-04 | -3.591997E-02 | 2.844256E-02 | -1.344764E-02 |
| 72 | -1.024257E+00 | 5.477342E-02 | -1.401835E-02 | -4.346985E-03 | 3.622503E-03 |
| 81 | 0.000000E+00 | -3.574435E-02 | 1.770901E-02 | -8.274725E-03 | 1.488502E-03 |
| 82 | 0.000000E+00 | -4.377960E-02 | 1.824440E-02 | -6.792759E-03 | 1.555154E-03 |
| 91 | -4.426834E-01 | -2.756455E-02 | 1.024456E-02 | -1.838919E-03 | 2.770990E-04 |
| 92 | -3.560475E+01 | -1.658160E-02 | 4.001975E-03 | -6.257420E-04 | 6.641088E-05 |
| Surface | $a_{12}$ | $a_{14}$ | $a_{16}$ | $a_{18}$ | $a_{20}$ |
| 11 | 1.773083E-06 | 5.881678E-06 | -1.807477E-06 | | |
| 12 | 3.796399E-04 | -6.948056E-05 | 7.216512E-06 | | |
| 21 | 1.096076E-03 | -1.867554E-04 | 1.430227E-05 | | |
| 22 | 8.048723E-04 | -9.525194E-05 | 1.596967E-05 | | |
| 31 | 2.337643E-04 | 3.920351E-05 | -3.615807E-06 | | |
| 32 | -4.296482E-03 | 1.558343E-03 | -2.268826E-04 | | |
| 41 | 6.143436E-03 | -1.404185E-03 | 9.862385E-05 | | |
| 42 | 2.831512E-02 | -1.308478E-02 | 3.869409E-03 | | |
| 51 | 1.529289E-02 | -5.883306E-03 | 1.464085E-03 | -2.059789E-04 | 1.237468E-05 |
| 52 | 7.660216E-03 | -2.776592E-03 | 6.363113E-04 | -8.031189E-05 | 4.235014E-06 |
| 61 | 4.655276E-03 | -1.694304E-03 | 3.492089E-04 | -3.873984E-05 | 1.792975E-06 |
| 62 | 5.783457E-03 | -1.210815E-03 | 1.502700E-04 | -1.027629E-05 | 2.980776E-07 |
| 71 | 3.997988E-03 | -7.562693E-04 | 8.419212E-05 | -4.653698E-06 | 8.381114E-08 |
| 72 | -1.035506E-03 | 1.566007E-04 | -1.289835E-05 | 5.223274E-07 | -7.278420E-09 |
| 81 | 5.971391E-05 | -6.258242E-05 | 9.521947E-06 | -6.225992E-07 | 1.548192E-08 |
| 82 | -2.160827E-04 | 1.843334E-05 | -9.423047E-07 | 2.649203E-08 | -3.164110E-10 |
| 91 | -3.164598E-05 | 2.402941E-06 | -1.121216E-07 | 2.905917E-09 | -3.204800E-11 |
| 92 | -5.002247E-06 | 2.619001E-07 | -8.863687E-09 | 1.717980E-10 | -1.444000E-12 |

FIG. 29

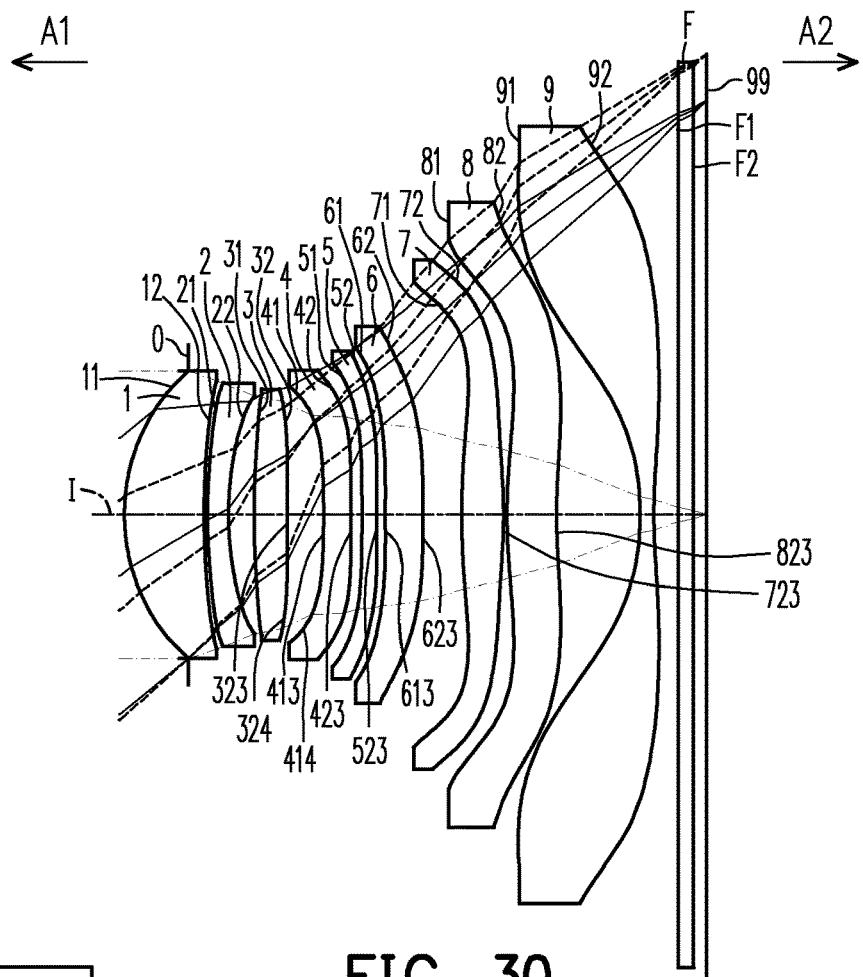
FIG. 30
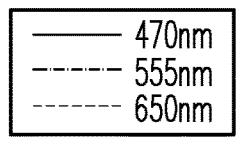
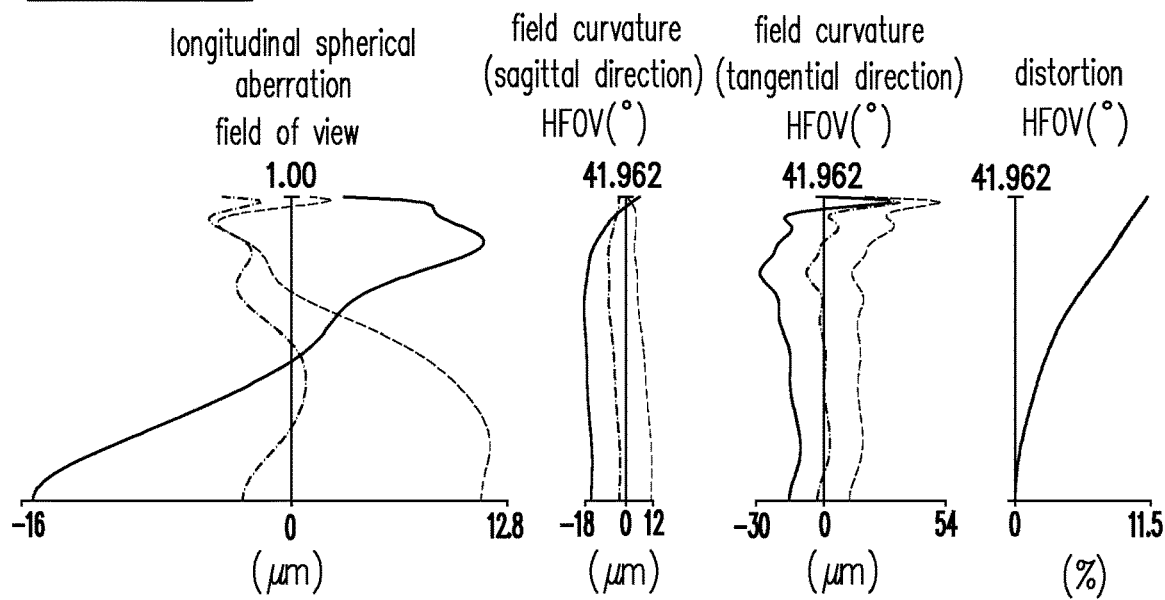
FIG.31A　　FIG.31B　FIG.31C FIG.31D

| Seventh embodiment ||||||
|---|---|---|---|---|---|
| EFL = 6.697 mm, HFOV = 41.962°, TTL = 8.460 mm, Fno = 1.600, ImgH = 6.700 mm ||||||
| Element | Surface | Radius of curvature (mm) | Thickness (mm) | Refractive index | Abbe number | Focal length (mm) |
| Object | | Infinity | Infinity | | | |
| Aperture 0 | | Infinity | -0.928 | | | |
| First lens element 1 | Object-side surface 11 | 2.896 | 1.159 | 1.545 | 55.987 | 6.923 |
| | Image-side surface 12 | 10.610 | 0.050 | | | |
| Second lens element 2 | Object-side surface 21 | 7.706 | 0.306 | 1.661 | 20.373 | -18.365 |
| | Image-side surface 22 | 4.656 | 0.373 | | | |
| Third lens element 3 | Object-side surface 31 | 12.317 | 0.488 | 1.535 | 55.690 | 22.182 |
| | Image-side surface 32 | -359.206 | 0.525 | | | |
| Fourth lens element 4 | Object-side surface 41 | -20.782 | 0.401 | 1.661 | 20.373 | -45.801 |
| | Image-side surface 42 | -65.478 | 0.158 | | | |
| Fifth lens element 5 | Object-side surface 51 | -50.537 | 0.215 | 1.661 | 20.373 | -48.836 |
| | Image-side surface 52 | 91.842 | 0.129 | | | |
| Sixth lens element 6 | Object-side surface 61 | 50.954 | 0.534 | 1.535 | 55.690 | -545.418 |
| | Image-side surface 62 | 43.245 | 0.568 | | | |
| Seventh lens element 7 | Object-side surface 71 | 10.504 | 0.610 | 1.545 | 55.987 | 8.357 |
| | Image-side surface 72 | -7.909 | 0.050 | | | |
| Eighth lens element 8 | Object-side surface 81 | 8.165 | 0.722 | 1.567 | 37.533 | 133.196 |
| | Image-side surface 82 | 8.856 | 1.217 | | | |
| Ninth lens element 9 | Object-side surface 91 | -4.233 | 0.200 | 1.535 | 55.690 | -5.167 |
| | Image-side surface 92 | 8.189 | 0.360 | | | |
| Filter F | Object-side surface F1 | Infinity | 0.210 | 1.517 | 64.167 | |
| | Image-side surface F2 | Infinity | 0.187 | | | |
| | Image plane 99 | Infinity | | | | |

FIG. 32

| Surface | K | $a_4$ | $a_6$ | $a_8$ | $a_{10}$ |
|---|---|---|---|---|---|
| 11 | 2.108973E-01 | -1.357818E-04 | 3.929017E-04 | -3.910101E-04 | 2.300292E-04 |
| 12 | 0.000000E+00 | -1.254506E-02 | 1.023915E-02 | -4.687990E-03 | 1.426513E-03 |
| 21 | 9.920365E+00 | -2.395414E-02 | 1.246097E-02 | -4.997792E-03 | 1.372483E-03 |
| 22 | -2.509587E+00 | -5.277102E-03 | 5.128136E-03 | -1.438555E-03 | 5.645313E-04 |
| 31 | 0.000000E+00 | -2.601233E-03 | -7.623526E-04 | -4.229546E-05 | 1.078822E-04 |
| 32 | 0.000000E+00 | -6.288224E-03 | -2.968231E-04 | -2.073516E-03 | 1.769871E-03 |
| 41 | 0.000000E+00 | -1.756099E-02 | -7.225168E-03 | 4.237988E-03 | -3.471228E-03 |
| 42 | 0.000000E+00 | -4.118264E-03 | -2.383324E-02 | 2.426948E-02 | -1.742249E-02 |
| 51 | 0.000000E+00 | 1.117075E-02 | -5.203392E-02 | 5.160131E-02 | -3.201143E-02 |
| 52 | 0.000000E+00 | -5.930835E-03 | -2.981402E-02 | 3.167083E-02 | -2.022786E-02 |
| 61 | 0.000000E+00 | -4.474353E-02 | 2.236576E-02 | -7.552099E-03 | 5.789970E-04 |
| 62 | 0.000000E+00 | -5.260197E-02 | 2.327374E-02 | -9.962826E-03 | 3.613654E-03 |
| 71 | 2.117812E+00 | -7.703699E-03 | 4.360111E-03 | -2.615476E-03 | 7.043666E-04 |
| 72 | -1.227931E+00 | 1.745591E-02 | 4.440000E-04 | -2.021956E-03 | 5.601145E-04 |
| 81 | -7.365389E+01 | 5.778306E-03 | -5.852279E-03 | 1.663261E-03 | -2.780645E-04 |
| 82 | -6.830362E+01 | -2.991745E-03 | -3.067650E-03 | 9.896414E-04 | -1.463188E-04 |
| 91 | -4.458208E-01 | -1.422643E-02 | 1.330756E-03 | 1.762597E-04 | -3.724955E-05 |
| 92 | -3.450040E+01 | -1.075598E-02 | 1.526666E-03 | -1.148370E-04 | 2.770945E-06 |
| Surface | $a_{12}$ | $a_{14}$ | $a_{16}$ | $a_{18}$ | $a_{20}$ |
| 11 | -7.536291E-05 | 1.298738E-05 | -1.004172E-06 | | |
| 12 | -2.764253E-04 | 3.372847E-05 | -1.887914E-06 | | |
| 21 | -2.217765E-04 | 2.311715E-05 | -1.253591E-06 | | |
| 22 | -1.470641E-04 | 3.912572E-05 | -3.107690E-06 | | |
| 31 | -7.026757E-05 | 3.967188E-05 | -4.955644E-06 | | |
| 32 | -8.335505E-04 | 2.176875E-04 | -2.354357E-05 | | |
| 41 | 1.442065E-03 | -2.716626E-04 | 1.701260E-05 | | |
| 42 | 7.844133E-03 | -2.218889E-03 | 3.909175E-04 | | |
| 51 | 1.294698E-02 | -3.338033E-03 | 5.180417E-04 | -4.326594E-05 | 1.458224E-06 |
| 52 | 8.483419E-03 | -2.259595E-03 | 3.617047E-04 | -3.149330E-05 | 1.141492E-06 |
| 61 | 6.073651E-04 | -2.574192E-04 | 4.576032E-05 | -3.943447E-06 | 1.349962E-07 |
| 62 | -9.820143E-04 | 1.834458E-04 | -2.183428E-05 | 1.473672E-06 | -4.251000E-08 |
| 71 | -1.062533E-04 | 9.552805E-06 | -5.330963E-07 | 1.812978E-08 | -2.938210E-10 |
| 72 | -7.180840E-05 | 4.511311E-06 | -9.584476E-08 | -2.830494E-09 | 1.267480E-10 |
| 81 | 2.813164E-05 | -1.799599E-06 | 7.370431E-08 | -1.793106E-09 | 1.965200E-11 |
| 82 | 1.157443E-05 | -4.960083E-07 | 1.040689E-08 | -6.072900E-11 | -6.740000E-13 |
| 91 | 3.043264E-06 | -1.413164E-07 | 3.906846E-09 | -6.012100E-11 | 3.980000E-13 |
| 92 | 2.158517E-07 | -2.062884E-08 | 7.337430E-10 | -1.236200E-11 | 8.200000E-14 |

FIG. 33

| Eighth embodiment | | | | | | |
|---|---|---|---|---|---|---|
| EFL = 7.058 mm, HFOV = 40.126°, TTL = 8.920 mm, Fno = 1.600, ImgH = 6.700 mm | | | | | | |
| Element | Surface | Radius of curvature (mm) | Thickness (mm) | Refractive index | Abbe number | Focal length (mm) |
| Object | | Infinity | Infinity | | | |
| Aperture 0 | | Infinity | -0.931 | | | |
| First lens element 1 | Object-side surface 11 | 3.137 | 1.071 | 1.545 | 55.987 | 7.345 |
| | Image-side surface 12 | 12.637 | 0.050 | | | |
| Second lens element 2 | Object-side surface 21 | 5.350 | 0.278 | 1.671 | 19.243 | -14.450 |
| | Image-side surface 22 | 3.387 | 0.175 | | | |
| Third lens element 3 | Object-side surface 31 | 6.863 | 0.549 | 1.567 | 37.533 | 20.158 |
| | Image-side surface 32 | 16.555 | 0.392 | | | |
| Fourth lens element 4 | Object-side surface 41 | -59.535 | 0.429 | 1.535 | 55.690 | 63.822 |
| | Image-side surface 42 | -21.808 | 0.271 | | | |
| Fifth lens element 5 | Object-side surface 51 | -11.225 | 0.366 | 1.640 | 23.529 | -28.886 |
| | Image-side surface 52 | -28.628 | 0.114 | | | |
| Sixth lens element 6 | Object-side surface 61 | -24.707 | 0.622 | 1.582 | 30.186 | 25.811 |
| | Image-side surface 62 | -9.469 | 0.532 | | | |
| Seventh lens element 7 | Object-side surface 71 | 17.655 | 0.485 | 1.671 | 19.243 | -19.128 |
| | Image-side surface 72 | 7.391 | 0.340 | | | |
| Eighth lens element 8 | Object-side surface 81 | 4.670 | 1.046 | 1.545 | 55.987 | 6.659 |
| | Image-side surface 82 | -15.149 | 1.147 | | | |
| Ninth lens element 9 | Object-side surface 91 | -3.277 | 0.200 | 1.535 | 55.690 | -4.545 |
| | Image-side surface 92 | 9.776 | 0.460 | | | |
| Filter F | Object-side surface F1 | Infinity | 0.210 | 1.517 | 64.167 | |
| | Image-side surface F2 | Infinity | 0.184 | | | |
| | Image plane 99 | Infinity | | | | |

FIG. 36

| Surface | K | $a_4$ | $a_6$ | $a_8$ | $a_{10}$ |
|---|---|---|---|---|---|
| 11 | 0.000000E+00 | 6.455671E-04 | 3.938510E-04 | -3.434860E-04 | 1.978199E-04 |
| 12 | 0.000000E+00 | -4.025814E-04 | 3.327345E-04 | 4.146048E-05 | -1.485008E-04 |
| 21 | 0.000000E+00 | -1.646924E-02 | 2.276122E-03 | -1.771665E-04 | -2.143109E-04 |
| 22 | 1.159954E+00 | -1.896196E-02 | 1.793332E-03 | -3.407615E-04 | -1.900935E-04 |
| 31 | 0.000000E+00 | 2.560215E-03 | 2.754170E-04 | 6.522228E-04 | -4.819314E-04 |
| 32 | 0.000000E+00 | -2.174507E-03 | -2.129129E-04 | 8.664575E-04 | -5.485100E-04 |
| 41 | 0.000000E+00 | -1.436283E-02 | 2.797741E-05 | -1.248451E-03 | 9.003750E-04 |
| 42 | 0.000000E+00 | -1.137515E-02 | -1.471570E-03 | -6.994041E-04 | 6.467134E-04 |
| 51 | 0.000000E+00 | -3.543575E-03 | -4.483408E-03 | 4.817725E-04 | -6.447729E-04 |
| 52 | 0.000000E+00 | -4.461253E-04 | -8.656490E-03 | 5.563994E-03 | -3.000798E-03 |
| 61 | 0.000000E+00 | -7.145206E-03 | -1.169012E-02 | 8.394910E-03 | -3.701157E-03 |
| 62 | 0.000000E+00 | -6.128177E-03 | -8.065758E-03 | 3.358521E-03 | -8.529183E-04 |
| 71 | 0.000000E+00 | -3.702349E-03 | -2.366820E-03 | 9.752574E-05 | -6.674722E-05 |
| 72 | 3.721295E-01 | -2.206070E-02 | 7.455861E-03 | -2.859519E-03 | 6.256238E-04 |
| 81 | 0.000000E+00 | -2.432497E-02 | 5.814320E-03 | -1.101508E-03 | 1.266040E-04 |
| 82 | 4.030857E+00 | 2.439855E-03 | -1.164074E-03 | 4.878738E-04 | -8.512323E-05 |
| 91 | -5.607731E+00 | -1.181888E-02 | 7.662856E-04 | 1.534869E-04 | -2.758615E-05 |
| 92 | 0.000000E+00 | -6.448670E-03 | 2.767071E-04 | 3.416667E-05 | -6.844814E-06 |
| Surface | $a_{12}$ | $a_{14}$ | $a_{16}$ | $a_{18}$ | $a_{20}$ |
| 11 | -5.921431E-05 | 9.173379E-06 | -5.869129E-07 | | |
| 12 | 6.744581E-05 | -1.248144E-05 | 8.636754E-07 | | |
| 21 | 1.276580E-04 | -2.656943E-05 | 1.993567E-06 | | |
| 22 | 8.433682E-05 | -1.559028E-05 | 1.384767E-06 | | |
| 31 | 1.607404E-04 | -3.075137E-05 | 3.507350E-06 | | |
| 32 | 2.289177E-04 | -5.646840E-05 | 5.745091E-06 | | |
| 41 | -2.776294E-04 | 3.484863E-05 | -3.417748E-07 | | |
| 42 | -1.473728E-04 | 8.653002E-06 | 1.076553E-06 | | |
| 51 | 3.607654E-04 | -8.737410E-05 | 5.857628E-06 | 0.000000E+00 | 0.000000E+00 |
| 52 | 8.961194E-04 | -1.404449E-04 | 9.165095E-06 | 0.000000E+00 | 0.000000E+00 |
| 61 | 8.932139E-04 | -1.032457E-04 | 4.505196E-06 | 0.000000E+00 | 0.000000E+00 |
| 62 | 1.329965E-04 | -9.390728E-06 | 1.719061E-07 | 0.000000E+00 | 0.000000E+00 |
| 71 | 5.517665E-05 | -1.391796E-05 | 1.570672E-06 | -8.188070E-08 | 1.625047E-09 |
| 72 | -7.700925E-05 | 4.883067E-06 | -8.916620E-08 | -5.539173E-09 | 2.319950E-10 |
| 81 | -8.110878E-06 | 1.029199E-07 | 2.181455E-08 | -1.362110E-09 | 2.511600E-11 |
| 82 | 7.672642E-06 | -3.943332E-07 | 1.168924E-08 | -1.857650E-10 | 1.219000E-12 |
| 91 | 2.066541E-06 | -8.848373E-08 | 2.253270E-09 | -3.189700E-11 | 1.940000E-13 |
| 92 | 5.255814E-07 | -2.235721E-08 | 5.500430E-10 | -7.318000E-12 | 4.100000E-14 |

FIG. 37

| Ninth embodiment | | | | | | |
|---|---|---|---|---|---|---|
| EFL = 6.571 mm, HFOV = 32.733°, TTL = 8.372 mm, Fno = 1.600, ImgH = 4.480 mm | | | | | | |
| Element | Surface | Radius of curvature (mm) | Thickness (mm) | Refractive index | Abbe number | Focal length (mm) |
| Object | | Infinity | Infinity | | | |
| Aperture 0 | | Infinity | -0.802 | | | |
| First lens element 1 | Object-side surface 11 | 3.064 | 1.093 | 1.545 | 55.987 | 7.039 |
| | Image-side surface 12 | 13.175 | 0.114 | | | |
| Second lens element 2 | Object-side surface 21 | 5.291 | 0.331 | 1.671 | 19.243 | -14.062 |
| | Image-side surface 22 | 3.316 | 0.118 | | | |
| Third lens element 3 | Object-side surface 31 | 5.511 | 0.589 | 1.535 | 55.690 | 13.828 |
| | Image-side surface 32 | 20.571 | 0.364 | | | |
| Fourth lens element 4 | Object-side surface 41 | -22.173 | 0.413 | 1.535 | 55.690 | -377.992 |
| | Image-side surface 42 | -25.054 | 0.293 | | | |
| Fifth lens element 5 | Object-side surface 51 | -10.216 | 0.291 | 1.640 | 23.529 | -28.369 |
| | Image-side surface 52 | -23.409 | 0.053 | | | |
| Sixth lens element 6 | Object-side surface 61 | -45.086 | 0.628 | 1.582 | 30.186 | 18.814 |
| | Image-side surface 62 | -8.904 | 0.436 | | | |
| Seventh lens element 7 | Object-side surface 71 | 36.067 | 0.517 | 1.661 | 20.373 | -18.922 |
| | Image-side surface 72 | 9.297 | 0.245 | | | |
| Eighth lens element 8 | Object-side surface 81 | 4.872 | 1.061 | 1.545 | 55.987 | 8.108 |
| | Image-side surface 82 | -45.029 | 0.937 | | | |
| Ninth lens element 9 | Object-side surface 91 | -3.937 | 0.270 | 1.535 | 55.690 | -4.582 |
| | Image-side surface 92 | 6.718 | 0.360 | | | |
| Filter F | Object-side surface F1 | Infinity | 0.210 | 1.517 | 64.167 | |
| | Image-side surface F2 | Infinity | 0.050 | | | |
| | Image plane 99 | Infinity | | | | |

FIG. 40

| Surface | K | $a_4$ | $a_6$ | $a_8$ | $a_{10}$ |
|---|---|---|---|---|---|
| 11 | 0.000000E+00 | 3.244848E-04 | 2.064094E-04 | -1.496677E-04 | 1.041814E-04 |
| 12 | 0.000000E+00 | -4.868932E-03 | 5.658400E-03 | -3.518109E-03 | 1.353120E-03 |
| 21 | 0.000000E+00 | -2.167768E-02 | 7.127393E-03 | -3.567290E-03 | 1.269147E-03 |
| 22 | 1.156278E+00 | -1.977786E-02 | -1.224129E-03 | 9.641558E-04 | -1.527741E-03 |
| 31 | 0.000000E+00 | 6.911814E-03 | -5.502662E-03 | 3.862033E-03 | -2.649907E-03 |
| 32 | 0.000000E+00 | -1.970908E-03 | -2.612821E-03 | 1.103621E-03 | 6.772584E-04 |
| 41 | 0.000000E+00 | -1.468547E-02 | -7.124312E-03 | 2.677768E-03 | 1.100631E-03 |
| 42 | 0.000000E+00 | -7.386122E-03 | -1.249135E-02 | 4.194995E-03 | 1.791574E-03 |
| 51 | 0.000000E+00 | 6.554484E-03 | -2.430857E-02 | 1.068279E-02 | -2.167877E-03 |
| 52 | 0.000000E+00 | 1.755529E-02 | -5.080029E-02 | 4.256853E-02 | -2.051098E-02 |
| 61 | 0.000000E+00 | 1.786387E-03 | -4.365591E-02 | 4.061191E-02 | -1.981543E-02 |
| 62 | 0.000000E+00 | -9.949966E-03 | -1.402249E-02 | 9.382555E-03 | -3.510508E-03 |
| 71 | 0.000000E+00 | -2.375658E-03 | -1.302623E-02 | 6.268976E-03 | -1.943936E-03 |
| 72 | -1.900465E+00 | -1.627217E-02 | -8.490969E-04 | 1.234103E-03 | -5.079281E-04 |
| 81 | 0.000000E+00 | -2.294658E-02 | 5.735615E-03 | -1.617285E-03 | 3.315893E-04 |
| 82 | -3.943754E+01 | 5.316592E-03 | -4.606133E-04 | -5.609240E-05 | -7.067410E-06 |
| 91 | -1.072932E+01 | -2.180882E-02 | 7.383767E-03 | -1.750427E-03 | 2.740332E-04 |
| 92 | 0.000000E+00 | -1.525755E-02 | 2.969380E-03 | -5.203886E-04 | 6.268272E-05 |
| Surface | $a_{12}$ | $a_{14}$ | $a_{16}$ | $a_{18}$ | $a_{20}$ |
| 11 | -3.898498E-05 | 7.602593E-06 | -5.816860E-07 | | |
| 12 | -2.997369E-04 | 3.541049E-05 | -1.716266E-06 | | |
| 21 | -2.184864E-04 | 8.747994E-06 | 1.253477E-06 | | |
| 22 | 1.080792E-03 | -3.203379E-04 | 3.369527E-05 | | |
| 31 | 1.457764E-03 | -3.905615E-04 | 3.972947E-05 | | |
| 32 | -5.418383E-04 | 1.406544E-04 | -1.325895E-05 | | |
| 41 | -1.074254E-03 | 2.870833E-04 | -2.559346E-05 | | |
| 42 | -1.653162E-03 | 4.523305E-04 | -4.463402E-05 | | |
| 51 | -2.356585E-04 | 1.678721E-04 | -2.342930E-05 | 0.000000E+00 | 0.000000E+00 |
| 52 | 5.518219E-03 | -7.908654E-04 | 4.803092E-05 | 0.000000E+00 | 0.000000E+00 |
| 61 | 5.199736E-03 | -6.888987E-04 | 3.635964E-05 | 0.000000E+00 | 0.000000E+00 |
| 62 | 7.716887E-04 | -8.790847E-05 | 4.019279E-06 | 0.000000E+00 | 0.000000E+00 |
| 71 | 3.589325E-04 | -3.011622E-05 | -1.339017E-06 | 4.497277E-07 | -2.342245E-08 |
| 72 | 1.188733E-04 | -1.757895E-05 | 1.625035E-06 | -8.465998E-08 | 1.875441E-09 |
| 81 | -5.233911E-05 | 5.864023E-06 | -4.138030E-07 | 1.607436E-08 | -2.597430E-10 |
| 82 | 4.738949E-06 | -6.117039E-07 | 3.577068E-08 | -1.010930E-09 | 1.122700E-11 |
| 91 | -2.583326E-05 | 1.457493E-06 | -4.829185E-08 | 8.672380E-10 | -6.517000E-12 |
| 92 | -4.852272E-06 | 2.360964E-07 | -6.970554E-09 | 1.139520E-10 | -7.900000E-13 |

FIG. 41

| Conditional expression | First embodiment | Second embodiment | Third embodiment | Fourth embodiment | Fifth embodiment |
|---|---|---|---|---|---|
| AAG | 2.381 | 2.154 | 2.251 | 2.198 | 1.874 |
| ALT | 4.949 | 4.563 | 4.425 | 4.764 | 4.573 |
| BFL | 0.644 | 0.881 | 0.837 | 0.926 | 0.881 |
| TL | 7.330 | 6.717 | 6.676 | 6.962 | 6.447 |
| TTL | 7.974 | 7.598 | 7.513 | 7.888 | 7.328 |
| EPD | 3.668 | 3.725 | 3.626 | 3.992 | 3.659 |
| V1+V2 | 68.863 | 79.516 | 75.230 | 75.230 | 76.360 |
| V3+V7 | 75.230 | 75.230 | 75.230 | 111.677 | 111.974 |
| V1+V2+V5 | 88.106 | 98.759 | 94.473 | 94.473 | 96.733 |
| V3+V4+V7 | 131.217 | 131.217 | 131.217 | 130.920 | 132.347 |
| V9/V5 | 2.909 | 2.909 | 2.909 | 2.909 | 2.734 |
| V5/V2 | 1.000 | 0.818 | 1.000 | 1.000 | 1.000 |
| V9/V1 | 1.128 | 1.000 | 1.000 | 1.000 | 0.995 |
| (ImgH+EPD)/(T3+G45+T5+G56) | 8.585 | 9.420 | 8.762 | 7.295 | 7.346 |
| ImgH/(G12+T2+G78) | 10.129 | 9.681 | 8.135 | 7.995 | 11.878 |
| ImgH/(T2+T4+G56+G78) | 5.174 | 5.602 | 4.301 | 4.650 | 6.156 |
| (T6+T7+T8+T9)/(T3+G45+T5+G78) | 2.445 | 2.315 | 2.195 | 1.501 | 1.845 |
| (AAG+BFL)/D11t32 | 1.997 | 1.868 | 2.193 | 1.241 | 1.317 |
| (G12+T2+G34+T4+G56+G78)/(G23+G45+G67) | 1.270 | 1.295 | 2.697 | 1.352 | 2.295 |
| EFL*Fno/ImgH | 1.878 | 1.907 | 1.856 | 2.044 | 1.873 |
| ImgH/(D12t32+G45) | 4.710 | 4.983 | 5.603 | 3.711 | 3.979 |
| D32t81/(T8+G89+T9) | 1.056 | 1.234 | 1.225 | 2.299 | 1.660 |
| Fno*D11t71/ALT | 1.119 | 1.206 | 1.158 | 1.562 | 1.481 |
| D11t52/(T7+T8+T9) | 1.071 | 1.244 | 1.190 | 2.195 | 2.254 |
| (TTL+TL)/ImgH | 3.061 | 2.863 | 2.838 | 2.970 | 2.755 |
| D12t41/(T4+G45) | 0.781 | 0.974 | 0.944 | 3.499 | 2.996 |
| (D12t41+G56+T6)/(G67+T7) | 0.968 | 1.107 | 1.359 | 1.677 | 2.999 |
| (ImgH+EPD)/(AAG+BFL) | 2.865 | 2.875 | 2.794 | 2.879 | 3.143 |
| ImgH/(Fno*(T3+G45+T7)) | 2.095 | 2.318 | 2.381 | 2.395 | 2.609 |
| (AAG+BFL)/(T7+T8+T9) | 1.165 | 1.380 | 1.403 | 1.903 | 1.844 |

FIG. 42

| Conditional expression | Sixth embodiment | Seventh embodiment | Eighth embodiment | Ninth embodiment |
|---|---|---|---|---|
| AAG | 1.932 | 3.069 | 3.021 | 2.560 |
| ALT | 4.526 | 4.634 | 5.045 | 5.192 |
| BFL | 0.855 | 0.757 | 0.854 | 0.620 |
| TL | 6.458 | 7.703 | 8.066 | 7.752 |
| TTL | 7.313 | 8.460 | 8.920 | 8.372 |
| EPD | 3.647 | 4.186 | 4.411 | 4.107 |
| V1+V2 | 76.360 | 76.360 | 75.230 | 75.230 |
| V3+V7 | 111.974 | 111.677 | 56.776 | 76.063 |
| V1+V2+V5 | 96.733 | 96.733 | 98.759 | 98.759 |
| V3+V4+V7 | 132.347 | 132.050 | 112.465 | 131.753 |
| V9/V5 | 2.734 | 2.734 | 2.367 | 2.367 |
| V5/V2 | 1.000 | 1.000 | 1.223 | 1.223 |
| V9/V1 | 0.995 | 0.995 | 0.995 | 0.995 |
| (ImgH+EPD)/(T3+G45+T5+G56) | 7.207 | 10.998 | 8.550 | 7.000 |
| ImgH/(G12+T2+G78) | 11.869 | 16.509 | 10.031 | 6.501 |
| ImgH/(T2+T4+G56+G78) | 6.001 | 7.566 | 5.771 | 4.301 |
| (T6+T7+T8+T9)/(T3+G45+T5+G78) | 1.746 | 2.268 | 1.542 | 1.746 |
| (AAG+BFL)/D11t32 | 1.310 | 1.611 | 1.826 | 1.417 |
| (G12+T2+G34+T4+G56+G78)/(G23+G45+G67) | 2.241 | 1.329 | 1.640 | 1.794 |
| EFL*Fno/ImgH | 1.867 | 1.599 | 1.685 | 2.347 |
| ImgH/(D12t32+G45) | 3.811 | 4.875 | 5.069 | 3.101 |
| D32t81/(T8+G89+T9) | 1.684 | 1.491 | 1.484 | 1.429 |
| Fno*D11t71/ALT | 1.507 | 1.694 | 1.537 | 1.455 |
| D11t52/(T7+T8+T9) | 2.349 | 2.399 | 2.068 | 1.952 |
| (TTL+TL)/ImgH | 2.754 | 2.412 | 2.535 | 3.599 |
| D12t41/(T4+G45) | 2.795 | 3.116 | 2.061 | 2.147 |
| (D12t41+G56+T6)/(G67+T7) | 2.999 | 2.041 | 2.143 | 2.306 |
| (ImgH+EPD)/(AAG+BFL) | 3.103 | 2.845 | 2.868 | 2.700 |
| ImgH/(Fno*(T3+G45+T7)) | 2.483 | 3.335 | 3.210 | 2.001 |
| (AAG+BFL)/(T7+T8+T9) | 1.898 | 2.499 | 2.238 | 1.721 |

FIG. 43

OPTICAL IMAGING LENS

CROSS-REFERENCE TO RELATED APPLICATION

This application claims the priority benefit of China application serial no. 202011503818.7, filed on Dec. 18, 2020. The entirety of the above-mentioned patent application is hereby incorporated by reference herein and made a part of this specification.

BACKGROUND

Technical Field

The disclosure relates to an optical component, and in particular to an optical imaging lens.

Description of Related Art

The specifications of a portable electronic device are changing quickly, and a key component thereof, an optical imaging lens, has also developed to be more diversified. The main optical imaging lens of a portable electronic device not only requires a larger aperture and maintains a shorter system length, but also requires higher pixels and higher resolution. Having high pixels implies that the image height of the lens must be increased, and a larger image sensor is adopted to receive imaging rays to increase the pixel requirement. However, due to the design of a large aperture, the optical imaging lens receives more imaging rays, which increases the difficulty of design. Having high pixels also requires the resolution of the lens to be improved. By the large aperture design, the design difficulty is multiplied. Therefore, how to add multiple lens elements into a limited system length of the optical imaging lens and improve the resolution while increasing the aperture and the image height is an issue that needs to be challenged and solved.

SUMMARY

The disclosure provides an optical imaging lens, which can simultaneously reduce the F-number, increase the image height, and improve the resolution.

An embodiment of the disclosure provides an optical imaging lens that sequentially includes a first lens element, a second lens element, a third lens element, a fourth lens element, a fifth lens element, a sixth lens element, a seventh lens element, an eighth lens element, and a ninth lens element along an optical axis from an object side to an image side. Each of the first lens element to the ninth lens element includes an object-side surface facing the object side and allowing imaging rays to pass through, and an image-side surface facing the image side and allowing the imaging rays to pass through. The first lens element has positive refracting power, and a periphery region of the image-side surface is concave. An optical axis region of the object-side surface of the second lens element is convex. An optical axis region of the image-side surface of the ninth lens element is concave. Lens elements of the optical imaging lens are only the nine lens elements, and the optical imaging lens satisfies the following conditional expression: $V1+V2 \leq 80.000$ and $V3+V7 \geq 50.000$, where $V1$ is the Abbe number of the first lens element, $V2$ is the Abbe number of the second lens element, $V3$ is the Abbe number of the third lens element, and $V7$ is the Abbe number of the seventh lens element.

An embodiment of the disclosure provides an optical imaging lens that sequentially includes a first lens element, a second lens element, a third lens element, a fourth lens element, a fifth lens element, a sixth lens element, a seventh lens element, an eighth lens element, and a ninth lens element along an optical axis from an object side to an image side. Each of the first lens element to the ninth lens element includes an object-side surface facing the object side and allowing imaging rays to pass through, and an image-side surface facing the image side and allowing the imaging rays to pass through. A periphery region of the image-side surface of the first lens element is concave. The second lens element has negative refracting power, and an optical axis region of the object-side surface is convex. An optical axis region of the object-side surface of the seventh lens element is convex. An optical axis region of the image-side surface of the ninth lens element is concave. Lens elements of the optical imaging lens are only the nine lens elements, and the optical imaging lens satisfies the following conditional expression: $V1+V2 \leq 80.000$, where $V1$ is the Abbe number of the first lens element and $V2$ is the Abbe number of the second lens element.

An embodiment of the disclosure provides an optical imaging lens that sequentially includes a first lens element, a second lens element, a third lens element, a fourth lens element, a fifth lens element, a sixth lens element, a seventh lens element, an eighth lens element, and a ninth lens element along an optical axis from an object side to an image side. Each of the first lens element to the ninth lens element includes an object-side surface facing the object side and allowing imaging rays to pass through, and an image-side surface facing the image side and allowing the imaging rays to pass through. The first lens element has positive refracting power, and a periphery region of the image-side surface is concave. The second lens element has negative refracting power. A periphery region of the object-side surface of the ninth lens element is convex, and an optical axis region of the image-side surface is concave. Lens elements of the optical imaging lens are only the above nine elements and satisfy the following conditional expression: $V3+V7 \geq 50.000$, where $V3$ is the Abbe number of the third lens element and $V7$ is the Abbe number of the seventh lens element.

Based on the above, the beneficial effects of the optical imaging lens of the embodiments of the disclosure are: by satisfying the concave-convex curved surface arrangement design of the lens elements, the conditions of the refracting power, and the design of the conditional expressions, the optical imaging lens can simultaneously reduce the F-number, increase the image height, improve the resolution, and meet the imaging quality.

BRIEF DESCRIPTION OF THE DRAWINGS

FIG. 6 is a schematic diagram of an optical imaging lens of a first embodiment of the disclosure.

FIG. 7A to FIG. 7D are diagrams of longitudinal spherical aberration and various aberrations of an optical imaging lens of a first embodiment.

FIG. 8 illustrates detailed optical data of an optical imaging lens of a first embodiment of the disclosure.

FIG. 9 illustrates aspheric parameters of an optical imaging lens of a first embodiment of the disclosure.

FIG. 10 is a schematic diagram of an optical imaging lens of a second embodiment of the disclosure.

FIG. 11A to FIG. 11D are diagrams of longitudinal spherical aberration and various aberrations of an optical imaging lens of a second embodiment.

FIG. 12 illustrates detailed optical data of an optical imaging lens of a second embodiment of the disclosure.

FIG. 13 illustrates aspheric parameters of an optical imaging lens of a second embodiment of the disclosure.

FIG. 14 is a schematic diagram of an optical imaging lens of a third embodiment of the disclosure.

FIG. 15A to FIG. 15D are diagrams of longitudinal spherical aberration and various aberrations of an optical imaging lens of a third embodiment.

FIG. 16 illustrates detailed optical data of an optical imaging lens of a third embodiment of the disclosure.

FIG. 17 illustrates aspheric parameters of an optical imaging lens of a third embodiment of the disclosure.

FIG. 18 is a schematic diagram of an optical imaging lens of a fourth embodiment of the disclosure.

FIG. 19A to FIG. 19D are diagrams of longitudinal spherical aberration and various aberrations of an optical imaging lens of a fourth embodiment.

FIG. 20 illustrates detailed optical data of an optical imaging lens of a fourth embodiment of the disclosure.

FIG. 21 illustrates aspheric parameters of an optical imaging lens of a fourth embodiment of the disclosure.

FIG. 22 is a schematic diagram of an optical imaging lens of a fifth embodiment of the disclosure.

FIG. 23A to FIG. 23D are diagrams of longitudinal spherical aberration and various aberrations of an optical imaging lens of a fifth embodiment.

FIG. 24 illustrates detailed optical data of an optical imaging lens of a fifth embodiment of the disclosure.

FIG. 25 illustrates aspheric parameters of an optical imaging lens of a fifth embodiment of the disclosure.

FIG. 26 is a schematic diagram of an optical imaging lens of a sixth embodiment of the disclosure.

FIG. 27A to FIG. 27D are diagrams of longitudinal spherical aberration and various aberrations of an optical imaging lens of a sixth embodiment.

FIG. 28 illustrates detailed optical data of an optical imaging lens of a sixth embodiment of the disclosure.

FIG. 29 illustrates aspheric parameters of an optical imaging lens of a sixth embodiment of the disclosure.

FIG. 30 is a schematic diagram of an optical imaging lens of a seventh embodiment of the disclosure.

FIG. 31A to FIG. 31D are diagrams of longitudinal spherical aberration and various aberrations of an optical imaging lens of a seventh embodiment.

FIG. 32 illustrates detailed optical data of an optical imaging lens of a seventh embodiment of the disclosure.

FIG. 33 illustrates aspheric parameters of an optical imaging lens of a seventh embodiment of the disclosure.

FIG. 36 illustrates detailed optical data of an optical imaging lens of an eighth embodiment of the disclosure.

FIG. 37 illustrates aspheric parameters of an optical imaging lens of an eighth embodiment of the disclosure.

FIG. 40 illustrates detailed optical data of an optical imaging lens of a ninth embodiment of the disclosure.

FIG. 41 illustrates aspheric parameters of an optical imaging lens of a ninth embodiment of the disclosure.

FIG. 42 and FIG. 43 illustrate all important parameters and numerical values of relational expressions of the optical imaging lenses of the first to ninth embodiments of the disclosure.

DETAILED DESCRIPTION OF DISCLOSED EMBODIMENTS

The terms "optical axis region", "periphery region", "concave", and "convex" used in this specification and claims should be interpreted based on the definition listed in the specification by the principle of lexicographer.

Figure 1:
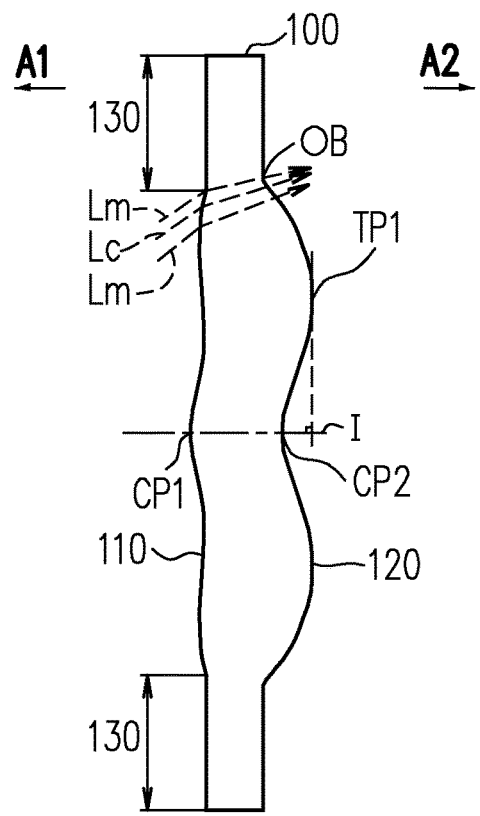
FIG. 1 is a schematic diagram illustrating a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
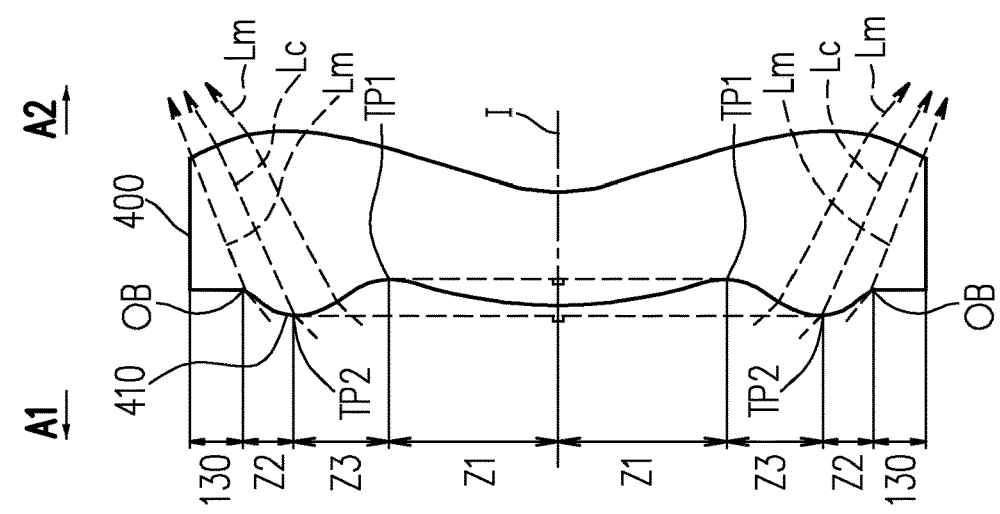
FIG. 4 is a schematic diagram illustrating a surface shape structure of a lens element of Example II.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
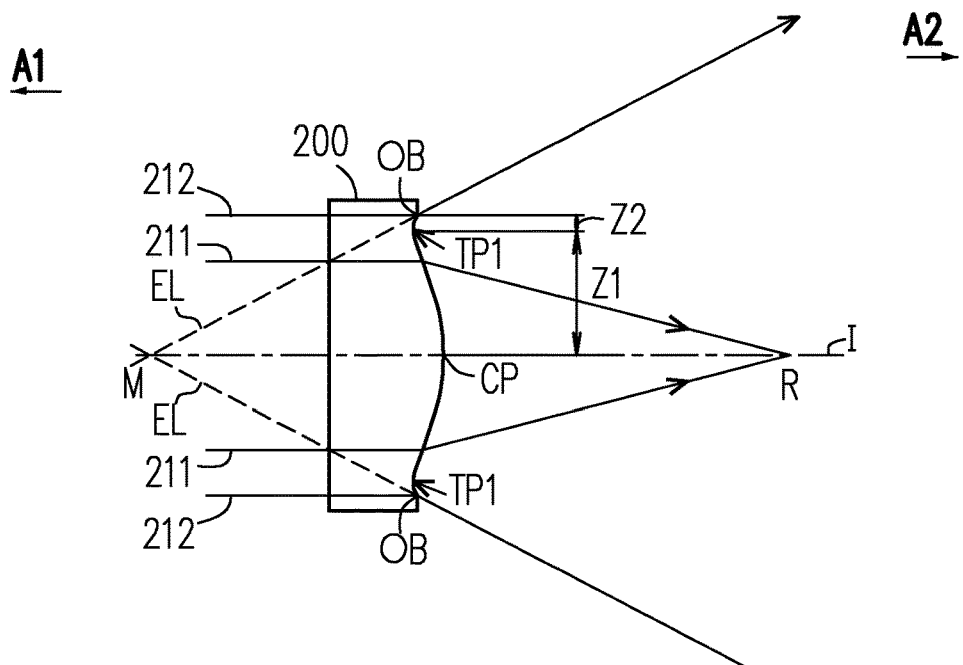
FIG. 2 is a schematic diagram illustrating a concave-convex structure and a focal point of rays of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
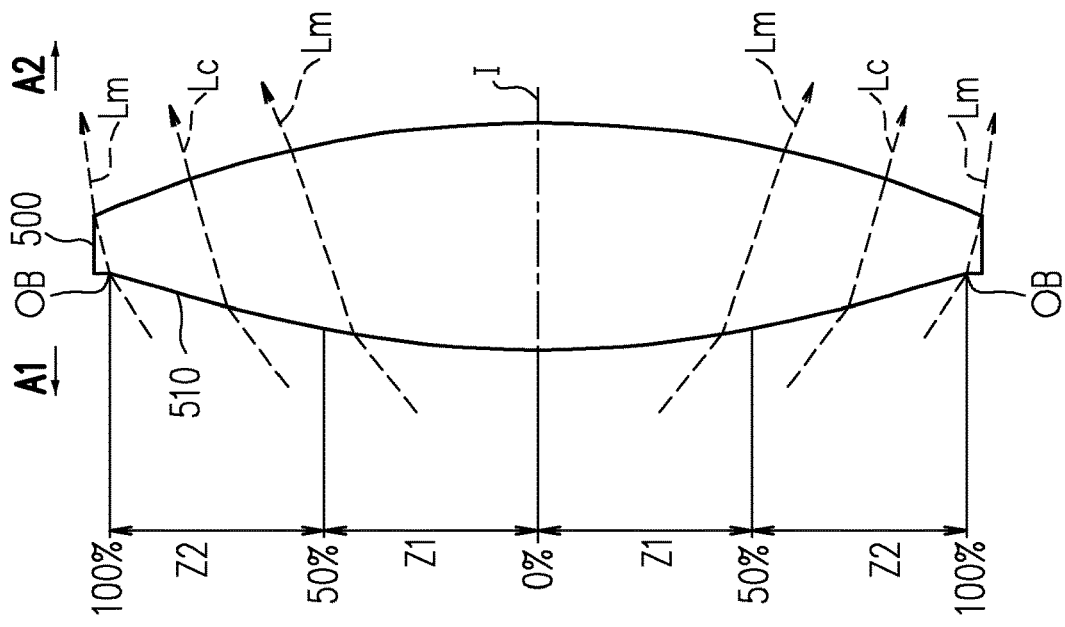
FIG. 5 is a schematic diagram illustrating a surface shape structure of a lens element of Example III.
Figure 3:
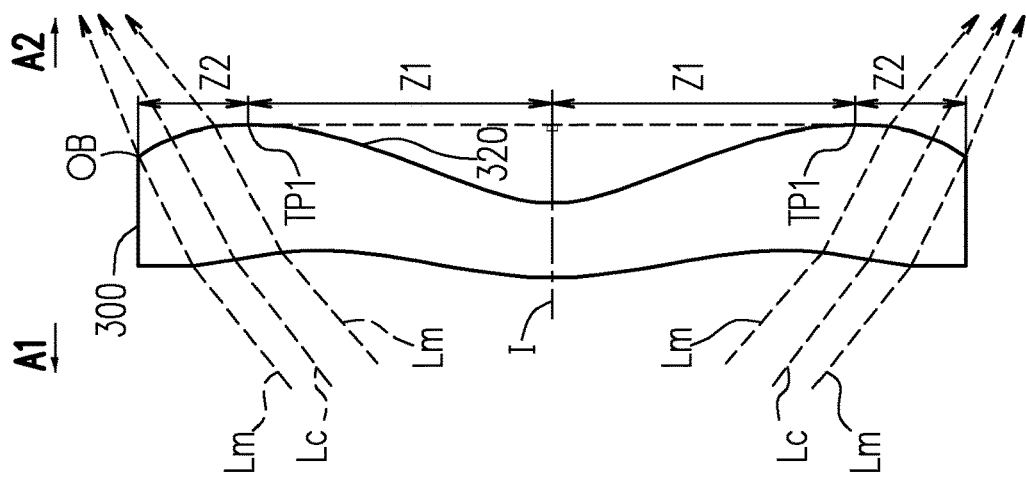
FIG. 3 is a schematic diagram illustrating a surface shape structure of a lens element of Example I.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram of an optical imaging lens of a first embodiment of the disclosure. FIG. 7A to FIG. 7D are diagrams of longitudinal spherical aberration and various aberrations of an optical imaging lens of a first embodiment. Please refer to FIG. 6 first. An optical imaging lens 10 of the first embodiment of the disclosure sequentially includes a first lens element 1, a second lens element 2, a third lens element 3, a fourth lens element 4, a fifth lens element 5, a sixth lens element 6, a seventh lens element 7, an eighth lens element 8, a ninth lens element 9, and a filter F along an optical axis I of the optical imaging lens 10 from an object side A1 to an image side A2. An aperture 0 is disposed on an object-side surface 11 of the first lens element 1. After rays emitted from an object enter the optical imaging lens 10, and pass through the aperture 0, the first lens element 1, the second lens element 2, the third lens element 3, the fourth lens element 4, the fifth lens element 5, the sixth lens element 6, the seventh lens element 7, the eighth lens element 8, the ninth lens element 9, and the filter F, an image is formed on an image plane 99. The filter F is disposed between an image-side surface 92 of the ninth lens element 9 and the image plane 99. It is supplemented that the object side A1 is a side facing the object and the image side A2 is a side facing the image plane 99. In an embodiment, the filter F may be an infrared (IR) cut filter, but the disclosure is not limited thereto.

In this embodiment, the first lens element 1, the second lens element 2, the third lens element 3, the fourth lens element 4, the fifth lens element 5, the sixth lens element 6, the seventh lens element 7, the eighth lens element 8, the ninth lens element 9, and the filter F of the optical imaging lens 10 respectively have an object-side surface 11, 21, 31, 41, 51, 61, 71, 81, 91, or F1 facing the object side A1 and allowing imaging rays to pass through, and an image-side surface 12, 22, 32, 42, 52, 62, 72, 82, 92, or F2 facing the image side A2 and allowing the imaging rays to pass through.

The first lens element 1 has positive refracting power. The material of the first lens element 1 may be plastic. In another embodiment, the material of the first lens element 1 may be glass. An optical axis region 113 of the object-side surface 11 of the first lens element 1 is convex, and a periphery region 114 thereof is convex. An optical axis region 123 of the image-side surface 12 of the first lens element 1 is concave, and a periphery region 124 thereof is concave. In this embodiment, the object-side surface 11 and the image-side surface 12 of the first lens element 1 are both aspheric surfaces, but the disclosure is not limited thereto.

The second lens element 2 has negative refracting power. The material of the second lens element 2 may be plastic. In another embodiment, the material of the second lens element 2 may be glass. An optical axis region 213 of the object-side surface 21 of the second lens element 2 is convex, and a periphery region 214 thereof is convex. An optical axis region 223 of the image-side surface 22 of the second lens element 2 is concave, and a periphery region 224 thereof is concave. In this embodiment, the object-side surface 21 and the image-side surface 22 of the second lens element 2 are both aspheric surfaces, but the disclosure is not limited thereto.

The third lens element 3 has negative refracting power. The material of the third lens element 3 may be plastic. In another embodiment, the material of the third lens element 3 may be glass. An optical axis region 313 of the object-side surface 31 of the third lens element 3 is convex, and a periphery region 314 thereof is convex. An optical axis region 323 of the image-side surface 32 of the third lens element 3 is concave, and a periphery region 324 thereof is concave. In this embodiment, the object-side surface 31 and the image-side surface 32 of the third lens element 3 are both aspheric surfaces, but the disclosure is not limited thereto.

The fourth lens element 4 has positive refracting power. The material of the fourth lens element 4 may be plastic. In another embodiment, the material of the fourth lens element 4 may be glass. An optical axis region 413 of the object-side surface 41 of the fourth lens element 4 is convex, and a periphery region 414 thereof is convex. An optical axis region 423 of the image-side surface 42 of the fourth lens element 4 is concave, and a periphery region 424 thereof is convex. In this embodiment, the object-side surface 41 and the image-side surface 42 of the fourth lens element 4 are both aspheric surfaces, but the disclosure is not limited thereto.

The fifth lens element 5 has positive refracting power. The material of the fifth lens element 5 may be plastic. In another embodiment, the material of the fifth lens element 5 may be glass. An optical axis region 513 of the object-side surface 51 of the fifth lens element 5 is concave, and a periphery region 514 thereof is concave. An optical axis region 523 of the image-side surface 52 of the fifth lens element 5 is convex, and a periphery region 524 thereof is convex. In this embodiment, the object-side surface 51 and the image-side surface 52 of the fifth lens element 5 are both aspheric surfaces, but the disclosure is not limited thereto.

The sixth lens element 6 has negative refracting power. The material of the sixth lens element 6 may be plastic. In another embodiment, the material of the sixth lens element 6 may be glass. An optical axis region 613 of the object-side surface 61 of the sixth lens element 6 is concave, and a periphery region 614 thereof is concave. An optical axis region 623 of the image-side surface 62 of the sixth lens element 6 is convex, and a periphery region 624 thereof is convex. In this embodiment, the object-side surface 61 and the image-side surface 62 of the sixth lens element 6 are both aspheric surfaces, but the disclosure is not limited thereto.

The seventh lens element 7 has negative refracting power. The material of the seventh lens element 7 may be plastic. In another embodiment, the material of the seventh lens element 7 may be glass. An optical axis region 713 of the object-side surface 71 of the seventh lens element 7 is convex, and a periphery region 714 thereof is concave. An optical axis region 723 of the image-side surface 72 of the seventh lens element 7 is concave, and a periphery region 724 thereof is convex. In this embodiment, the object-side surface 71 and the image-side surface 72 of the seventh lens element 7 are both aspheric surfaces, but the disclosure is not limited thereto.

The eighth lens element 8 has positive refracting power. The material of the eighth lens element 8 may be plastic. In another embodiment, the material of the eighth lens element 8 may be glass. An optical axis region 813 of the object-side surface 81 of the eighth lens element 8 is convex, and a periphery region 814 thereof is concave. An optical axis region 823 of the image-side surface 82 of the eighth lens element 8 is convex, and a periphery region 824 thereof is convex. In this embodiment, the object-side surface 81 and the image-side surface 82 of the eighth lens element 8 are both aspheric surfaces, but the disclosure is not limited thereto.

The ninth lens element 9 has negative refracting power. The material of the ninth lens element 9 may be plastic. In another embodiment, the material of the ninth lens element 9 may be glass. An optical axis region 913 of the object-side surface 91 of the ninth lens element 9 is concave, and a periphery region 914 thereof is convex. An optical axis region 923 of the image-side surface 92 of the ninth lens element 9 is concave, and a periphery region 924 thereof is convex. In this embodiment, the object-side surface 91 and the image-side surface 92 of the ninth lens element 9 are both aspheric surfaces, but the disclosure is not limited thereto.

In this embodiment, lens elements of the optical imaging lens 10 are only the nine lens elements.

Other detailed optical data of the first embodiment is shown in FIG. 8, and the effective focal length (EFL) of the optical imaging lens 10 of the first embodiment is 5.868 millimeters (mm), the half field of view (HFOV) is 39.920°, the F-number (F-number, Fno) is 1.600, the system length is 7.974 mm, and the image height is 5.000 mm. The system length refers to the distance from the object-side surface 11 of the first lens element 1 to the image plane 99 on the optical axis I.

In addition, in this embodiment, a total of the eighteen object-side surfaces 11, 21, 31, 41, 51, 61, 71, 81, and 91, and image-side surfaces 12, 22, 32, 42, 52, 62, 72, 82, and 92 of the first lens element 1, the second lens element 2, the third lens element 3, the fourth lens element 4, the fifth lens element 5, the sixth lens element 6, the seventh lens element 7, the eighth lens element 8, and the ninth lens element 9 are all aspheric surfaces. The object-side surfaces 11, 21, 31, 41, 51, 61, 71, 81, and 91, and the image-side surfaces 12, 22, 32, 42, 52, 62, 72, 82, and 92 are general even aspheric surfaces. The aspheric surfaces are defined by the following equation:

$$Z(Y) = \frac{Y^2}{R}\left(1 + \sqrt{1-(1+K)\frac{Y^2}{R^2}}\right) + \sum_{i=1}^{n} a_i \times Y^i \quad (1)$$

where
R: the radius of curvature of a lens element surface near the optical axis I;

Z: the depth of an aspheric surface (the perpendicular distance between a point Y from the optical axis I on the aspheric surface and a tangent plane tangent to the vertex on the aspheric optical axis I);

Y: the distance between a point on an aspheric curve and the optical axis I;

K: conic constant; and $a_i$: the i-th order aspheric coefficient.

The aspheric coefficients of the object-side surface 11 of the first lens element 1 to the image-side surface 92 of the ninth lens element 9 in Equation (1) are shown in FIG. 9. A column number 11 in FIG. 9 indicates the aspheric coefficient of the object-side surface 11 of the first lens element 1, and the other columns may be deduced by analogy. In this embodiment and the following embodiments, the 2-nd order aspheric coefficients $a_2$ are all 0.

In addition, the relationship between important parameters in the optical imaging lens 10 of the first embodiment is shown in FIG. 42.

T1 is the thickness of the first lens element 1 on the optical axis I;

T2 is the thickness of the second lens element 2 on the optical axis I;

T3 is the thickness of the third lens element 3 on the optical axis I;

T4 is the thickness of the fourth lens element 4 on the optical axis I;

T5 is the thickness of the fifth lens element 5 on the optical axis I;

T6 is the thickness of the sixth lens element 6 on the optical axis I;

T7 is the thickness of the seventh lens element 7 on the optical axis I;

T8 is the thickness of the eighth lens element 8 on the optical axis I;

T9 is the thickness of the ninth lens element 9 on the optical axis I;

G12 is the air gap between the first lens element 1 and the second lens element 2 on the optical axis I, and is also the distance from the image-side surface 12 of the first lens element 1 to the object-side surface 21 of the second lens element 2 on the optical axis I;

G23 is the air gap between the second lens element 2 and the third lens element 3 on the optical axis I, and is also the distance from the image-side surface 22 of the second lens element 2 to the object-side surface 31 of the third lens element 3 on the optical axis I;

G34 is the air gap between the third lens element 3 and the fourth lens element 4 on the optical axis I, and is also the distance from the image-side surface 32 of the third lens element 3 to the object-side surface 41 of the fourth lens element 4 on the optical axis I;

G45 is the air gap between the fourth lens element 4 and the fifth lens element 5 on the optical axis I, and is also the distance from the image-side surface 42 of the fourth lens element 4 to the object-side surface 51 of the fifth lens element 5 on the optical axis I;

G56 is the air gap between the fifth lens element 5 and the sixth lens element 6 on the optical axis I, and is also the distance from the image-side surface 52 of the fifth lens element 5 to the object-side surface 61 of the sixth lens element 6 on the optical axis I;

G67 is the air gap between the sixth lens element 6 and the seventh lens element 7 on the optical axis I, and is also the distance from the image-side surface 62 of the sixth lens element 6 to the object-side surface 71 of the seventh lens element 7 on the optical axis I;

G78 is the air gap between the seventh lens element 7 and the eighth lens element 8 on the optical axis I, and is also the distance from the image-side surface 72 of the seventh lens element 7 to the object-side surface 81 of the eighth lens element 8 on the optical axis I;

G89 is the air gap between the eighth lens element 8 and the ninth lens element 9 on the optical axis I, and is also the distance from the image-side surface 82 of the eighth lens element 8 to the object-side surface 91 of the ninth lens element 9 on the optical axis I;

AAG is the sum of eight air gaps from the first lens element 1 to the ninth lens element 9 on the optical axis I, that is, the sum of the air gaps G12, G23, G34, G45, G56, G67, G78, and G89;

ALT is the sum of thicknesses of the nine lens elements from the first lens element 1 to the ninth lens element 9 on the optical axis I, that is, the sum of thicknesses T1, T2, T3, T4, T5, T6, T7, T8, and T9;

TL is the distance from the object-side surface 11 of the first lens element 1 to the image-side surface 92 of the ninth lens element 9 on the optical axis I;

TTL is the distance from the object-side surface 11 of the first lens element 1 to the image plane 99 on the optical axis I;

BFL is the distance from the image-side surface 92 of the ninth lens element 9 to the image plane 99 on the optical axis I;

D11t32 is the distance from the object-side surface 11 of the first lens element 1 to the image-side surface 32 of the third lens element 3 on the optical axis I;

D12t32 is the distance from the image-side surface 12 of the first lens element 1 to the image-side surface 32 of the third lens element 3 on the optical axis I;

D32t81 is the distance from the image-side surface 32 of the third lens element 3 to the object-side surface 81 of the eighth lens element 8 on the optical axis I;

D11t71 is the distance from the object-side surface 11 of the first lens element 1 to the object-side surface 71 of the seventh lens element 7 on the optical axis I;

D11t52 is the distance from the object-side surface 11 of the first lens element 1 to the image-side surface 52 of the fifth lens element 5 on the optical axis I;

D12t41 is the distance from the image-side surface 12 of the first lens element 1 to the object-side surface 41 of the fourth lens element 4 on the optical axis I;

Fno is the F-number of the optical imaging lens 10;

ImgH is the image height of the optical imaging lens 10;

EFL is the effective focal length of the optical imaging lens 10;

EPD is the entrance pupil diameter of the optical imaging lens 10, which is equal to the effective focal length divided by an F-number of the optical imaging lens 10; and HFOV is the half field of view of the optical imaging lens 10.

In addition, it is further defined that:

G9F is the air gap between the ninth lens element 9 and the filter F on the optical axis I, and is also the distance from the image-side surface 92 of the ninth lens element 9 to the object-side surface F1 of the filter F on the optical axis I;

TF is the thickness of the filter F on the optical axis I;

GFP is the air gap between the filter F and the image plane 99 on the optical axis I, and is also the distance from the image-side surface F2 of the filter F to the image plane 99 on the optical axis I;

f1 is the focal length of the first lens element 1;
f2 is the focal length of the second lens element 2;
f3 is the focal length of the third lens element 3;
f4 is the focal length of the fourth lens element 4;
f5 is the focal length of the fifth lens element 5;
f6 is the focal length of the sixth lens element 6;
f7 is the focal length of the seventh lens element 7;
f8 is the focal length of the eighth lens element 8;
f9 is the focal length of the ninth lens element 9;
n1 is the refractive index of the first lens element 1;
n2 is the refractive index of the second lens element 2;
n3 is the refractive index of the third lens element 3;
n4 is the refractive index of the fourth lens element 4;
n5 is the refractive index of the fifth lens element 5;
n6 is the refractive index of the sixth lens element 6;
n7 is the refractive index of the seventh lens element 7;
n8 is the refractive index of the eighth lens element 8;
n9 is the refractive index of the ninth lens element 9;
V1 is the Abbe number of the first lens element 1, and the Abbe number may also be referred to as the chromatic dispersion coefficient;
V2 is the Abbe number of the second lens element 2;
V3 is the Abbe number of the third lens element 3;
V4 is the Abbe number of the fourth lens element 4;
V5 is the Abbe number of the fifth lens element 5;
V6 is the Abbe number of the sixth lens element 6;
V7 is the Abbe number of the seventh lens element 7;
V8 is the Abbe number of the eighth lens element 8; and
V9 is the Abbe number of the ninth lens element 9.

Please refer to FIG. 7A to FIG. 7D. FIG. 7A illustrates the longitudinal spherical aberration of the first embodiment. FIG. 7B and FIG. 7C respectively illustrate the field curvature aberration in the sagittal direction and the field curvature aberration in the tangential direction on the image plane 99 of the first embodiment when the wavelengths are 470 nm, 555 nm, and 650 nm. FIG. 7D illustrates the distortion aberration on the image plane 99 of the first embodiment when the wavelengths are 470 nm, 555 nm, and 650 nm. The longitudinal spherical aberration of the first embodiment is shown in FIG. 7A. The curves formed by the wavelengths are all very close to and approaching the middle, which indicates that off-axis rays at different heights of each wavelength are all concentrated near an imaging point. It can be seen from the skewness of the curve of each wavelength that the deviation of the imaging point of the off-axis rays at different heights is controlled within the range of ±37 microns (μm). Therefore, the first embodiment does significantly improve the spherical aberration of the same wavelength. In addition, the distances between the three representative wavelengths are also fairly close to each other, which represents that the imaging positions of rays with different wavelengths are fairly concentrated, so that the chromatic aberration is also significantly improved.

In the two field curvature aberration diagrams in FIG. 7B and FIG. 7C, the focal length variation of the three representative wavelengths within the entire field of view fall within ±35 μm, which indicates that the optical system of the first embodiment can effectively eliminate aberrations. The distortion aberration diagram in FIG. 7D shows that the distortion aberration of the first embodiment is maintained within the range of ±2.5%, which indicates that the distortion aberration of the first embodiment meets imaging quality requirements of the optical system. Compared with the existing optical lens, the first embodiment can still provide good imaging quality under the condition that the system length is shortened to 7.974 mm. Therefore, the first embodiment can simultaneously reduce the F-number, increase the image height, improve the resolution, and meet the imaging quality under the condition of maintaining good optical performance.

FIG. 10 is a schematic diagram of an optical imaging lens of a second embodiment of the disclosure. FIG. 11A to FIG. 11D are diagrams of longitudinal spherical aberration and various aberrations of an optical imaging lens of a second embodiment. Please refer to FIG. 10 first. The optical imaging lens 10 of the second embodiment of the disclosure is substantially similar to the first embodiment, and the differences between the two are as follows: various optical data, aspheric coefficients, and parameters between the lens elements 1, 2, 3, 4, 5, 6, 7, 8, and 9 are more or less different. In addition, in this embodiment, the fifth lens element has negative refracting power. It should be noted here that in order to clearly show the drawing, the reference numerals of the optical axis regions and the periphery regions similar to the first embodiment are omitted in FIG. 10.

The detailed optical data of the optical imaging lens 10 of the second embodiment is shown in FIG. 12, and the effective focal length of the optical imaging lens 10 of the second embodiment is 5.960 mm, the half field of view (HFOV) is 38.311°, the F-number (Fno) is 1.600, the system length is 7.598 mm, and the image height is 5.000 mm.

Various aspheric coefficients of the object-side surface 11 of the first lens element 1 to the image-side surface 92 of the ninth lens element 9 of the second embodiment in Equation (1) are shown in FIG. 13.

In addition, the relationship between important parameters in the optical imaging lens 10 of the second embodiment is shown in FIG. 42.

The longitudinal spherical aberration of the second embodiment is shown in FIG. 11A, and the deviation of an imaging point of off-axis rays at different heights is controlled within the range of ±21 µm. In the two field curvature aberration diagrams of FIG. 11B and FIG. 11C, the focal length variation of the three representative wavelengths within the entire field of view falls within ±31 µm. The distortion aberration diagram of FIG. 11D shows that the distortion aberration of the second embodiment is maintained within the range of ±6.5%.

It can be known from the above description that the system length of the second embodiment is shorter than the system length of the first embodiment. In addition, the longitudinal spherical aberration and the field curvature aberration of the second embodiment surpass the first embodiment.

FIG. 14 is a schematic diagram of an optical imaging lens of a third embodiment of the disclosure. FIG. 15A to FIG. 15D are diagrams of longitudinal spherical aberration and various aberrations of an optical imaging lens of a third embodiment. Please refer to FIG. 14 first. The optical imaging lens 10 of the third embodiment of the disclosure is substantially similar to the first embodiment, and the differences between the two are as follows: various optical data, aspheric coefficients, and parameters between the lens elements 1, 2, 3, 4, 5, 6, 7, 8, and 9 are more or less different. In addition, in this embodiment, the fifth lens element has negative refracting power. It should be noted here that in order to clearly show the drawing, the reference numerals of the optical axis regions and the periphery regions similar to the first embodiment are omitted in FIG. 14.

The detailed optical data of the optical imaging lens 10 of the third embodiment is shown in FIG. 16, and the effective focal length of the optical imaging lens 10 of the third embodiment is 5.801 mm, the half field of view (HFOV) is 38.499°, the F-number (Fno) is 1.600, the system length is 7.513 mm, and the image height is 5.000 mm.

Various aspheric coefficients of the object-side surface 11 of the first lens element 1 to the image-side surface 92 of the ninth lens element 9 of the third embodiment in Equation (1) are shown in FIG. 17.

In addition, the relationship between important parameters in the optical imaging lens 10 of the third embodiment is shown in FIG. 42.

The longitudinal spherical aberration of the third embodiment is shown in FIG. 15A, and the deviation of an imaging point of off-axis rays at different heights is controlled within the range of ±19 µm. In the two field curvature aberration diagrams of FIG. 15B and FIG. 15C, the focal length variation of the three representative wavelengths within the entire field of view falls within ±30 µm. The distortion aberration diagram of FIG. 15D shows that the distortion aberration of the third embodiment is maintained within the range of ±9%.

It can be known from the above description that the system length of the third embodiment is shorter than the system length of the first embodiment. In addition, the longitudinal spherical aberration and the field curvature aberration of the third embodiment surpass the first embodiment.

FIG. 18 is a schematic diagram of an optical imaging lens of a fourth embodiment of the disclosure. FIG. 19A to FIG. 19D are diagrams of longitudinal spherical aberration and various aberrations of an optical imaging lens of a fourth embodiment. Please refer to FIG. 18 first. The optical imaging lens 10A of the fourth embodiment of the disclosure is substantially similar to the first embodiment, and the differences between the two are as follows: various optical data, aspheric coefficients, and parameters between the lens elements 1, 2, 3, 4, 5, 6, 7, 8, and 9 are more or less different. In addition, in this embodiment, the third lens element 3 has positive refracting power. The periphery region 314 of the object-side surface 31 of the third lens element 3 is concave. The optical axis region 323 of the image-side surface 32 of the third lens element 3 is convex, and the periphery region 324 of the image-side surface 32 is convex. The optical axis region 413 of the object-side surface 41 of the fourth lens element 4 is concave, and the periphery region 414 of the object-side surface 41 is concave. The optical axis region 423 of the image-side surface 42 of the fourth lens element 4 is convex. The fifth lens element 5 has negative refracting power. The sixth lens element 6 has positive refracting power. The optical axis region 613 of the object-side surface 61 of the sixth lens element 6 is convex. The optical axis region 623 of the image-side surface 62 of the sixth lens element 6 is concave. The seventh lens element 7 has positive refracting power. The optical axis region 723 of the image-side surface 72 of the seventh lens element 7 is convex. The eighth lens element 8 has negative refracting power. The optical axis region 813 of the object-side surface 81 of the eighth lens element 8 is concave. It should be noted here that in order to clearly show the drawing, the reference numerals of the optical axis regions and the periphery regions similar to the first embodiment are omitted in FIG. 18.

The detailed optical data of the optical imaging lens 10 of the fourth embodiment is shown in FIG. 20, and the effective focal length of the optical imaging lens 10 of the fourth embodiment is 6.388 mm, the half field of view (HFOV) is 35.668°, the F-number (Fno) is 1.600, the system length is 7.888 mm, and the image height is 5.000 mm.

Various aspheric coefficients of the object-side surface 11 of the first lens element 1 to the image-side surface 92 of the ninth lens element 9 of the fourth embodiment in Equation (1) are shown in FIG. 21.

In addition, the relationship between important parameters in the optical imaging lens 10 of the fourth embodiment is shown in FIG. 42.

The longitudinal spherical aberration of the fourth embodiment is shown in FIG. 19A, and the deviation of an imaging point of off-axis rays at different heights is controlled within the range of ±10 µm. In the two field curvature aberration diagrams of FIG. 19B and FIG. 19C, the focal length variation of the three representative wavelengths within the entire field of view falls within ±16 µm. The distortion aberration diagram of FIG. 19D shows that the distortion aberration of the fourth embodiment is maintained within the range of ±9.10%.

It can be known from the above description that the system length of the fourth embodiment is shorter than the system length of the first embodiment. In addition, the longitudinal spherical aberration and the field curvature aberration of the fourth embodiment surpass the first embodiment.

FIG. 22 is a schematic diagram of an optical imaging lens of a fifth embodiment of the disclosure. FIG. 23A to FIG. 23D are diagrams of longitudinal spherical aberration and various aberrations of an optical imaging lens of a fifth embodiment. Please refer to FIG. 22 first. The optical imaging lens 10 of the fifth embodiment of the disclosure is substantially similar to the first embodiment, and the differences between the two are as follows: various optical data, aspheric coefficients, and parameters between the lens elements 1, 2, 3, 4, 5, 6, 7, 8, and 9 are more or less different. In addition, in this embodiment, the third lens element 3 has positive refracting power. The periphery region 324 of the image-side surface 32 of the third lens element 3 is convex. The fourth lens element 4 has negative refracting power. The optical axis region 413 of the object-side surface 41 of the fourth lens element 4 is concave, and the periphery region 414 of the object-side surface 41 is concave. The optical axis region 423 of the image-side surface 42 of the fourth lens element 4 is convex. The fifth lens element 5 has negative refracting power. The optical axis region 523 of the image-side surface 52 of the fifth lens element 5 is concave. The optical axis region 613 of the object-side surface 61 of the sixth lens element 6 is convex. The optical axis region 623 of the image-side surface 62 of the sixth lens element 6 is concave. The seventh lens element 7 has positive refracting power. The optical axis region 723 of the image-side surface 72 of the seventh lens element 7 is convex. The optical axis region 823 of the image-side surface 82 of the eighth lens element 8 is concave. It should be noted here that in order to clearly show the drawing, the reference numerals of the optical axis regions and the periphery regions similar to the first embodiment are omitted in FIG. 22.

The detailed optical data of the optical imaging lens 10 of the fifth embodiment is shown in FIG. 24, and the effective focal length of the optical imaging lens 10 of the fifth embodiment is 5.854 mm, the half field of view (HFOV) is 37.813°, the F-number (Fno) is 1.600, the system length is 7.328 mm, and the image height is 5.000 mm.

Various aspheric coefficients of the object-side surface 11 of the first lens element 1 to the image-side surface 92 of the ninth lens element 9 of the fifth embodiment Equation (1) are shown in FIG. 25.

In addition, the relationship between important parameters in the optical imaging lens 10 of the fifth embodiment is shown in FIG. 42.

The longitudinal spherical aberration of the fifth embodiment is shown in FIG. 23A, and the deviation of an imaging point of off-axis rays at different heights is controlled within the range of ±13 µm. In the two field curvature aberration diagrams of FIG. 23B and FIG. 23C, the focal length variation of the three representative wavelengths within the entire field of view falls within ±26 µm. The distortion aberration diagram of FIG. 23D shows that the distortion aberration of the fifth embodiment is maintained within the range of ±10.5%.

It can be known from the above description that the system length of the fifth embodiment is shorter than the system length of the first embodiment. In addition, the longitudinal spherical aberration and the field curvature aberration of the fifth embodiment surpass the first embodiment.

FIG. 26 is a schematic diagram of an optical imaging lens of a sixth embodiment of the disclosure. FIG. 27A to FIG. 27D are diagrams of longitudinal spherical aberration and various aberrations of an optical imaging lens of a sixth embodiment. Please refer to FIG. 26 first. The optical imaging lens 10 of the sixth embodiment of the disclosure is substantially similar to the first embodiment, and the differences between the two are as follows: various optical data, aspheric coefficients, and parameters between the lens elements 1, 2, 3, 4, 5, 6, 7, 8, and 9 are more or less different. In addition, in this embodiment, the third lens element 3 has positive refracting power. The periphery region 324 of the image-side surface 32 of the third lens element 3 is convex. The fourth lens element 4 has negative refracting power. The optical axis region 413 of the object-side surface 41 of the fourth lens element 4 is concave, and the periphery region 414 of the object-side surface 41 is concave. The optical axis region 423 of the image-side surface 42 of the fourth lens element 4 is convex. The fifth lens element 5 has negative refracting power. The optical axis region 523 of the image-side surface 52 of the fifth lens element 5 is concave. The optical axis region 613 of the object-side surface 61 of the sixth lens element 6 is convex. The optical axis region 623 of the image-side surface 62 of the sixth lens element 6 is concave. The seventh lens element 7 has positive refracting power. The optical axis region 723 of the image-side surface 72 of the seventh lens element 7 is convex. The optical axis region 823 of the image-side surface 82 of the eighth lens element 8 is concave. It should be noted here that in order to clearly show the drawing, the reference numerals of the optical axis regions and the periphery regions similar to the first embodiment are omitted in FIG. 26.

The detailed optical data of the optical imaging lens 10 of the sixth embodiment is shown in FIG. 28, and the effective focal length of the optical imaging lens 10 of the sixth embodiment is 5.836 mm, the half field of view (HFOV) is 37.580°, the F-number (Fno) is 1.600, the system length is 7.313 mm, and the image height is 5.000 mm.

Various aspheric coefficients of the object-side surface 11 of the first lens element 1 to the image-side surface 92 of the ninth lens element 9 of the sixth embodiment in Equation (1) are shown in FIG. 29.

In addition, the relationship between important parameters in the optical imaging lens 10 of the sixth embodiment is shown in FIG. 43.

The longitudinal spherical aberration of the sixth embodiment is shown in FIG. 27A, and the deviation of an imaging point of off-axis rays at different heights is controlled within the range of ±13 µm. In the two field curvature aberration diagrams of FIG. 27B and FIG. 27C, the focal length variation of the three representative wavelengths within the entire field of view falls within ±26 µm. The distortion aberration diagram of FIG. 27D shows that the distortion aberration of the sixth embodiment is maintained within the range of ±12%.

It can be known from the above description that the system length of the sixth embodiment is shorter than the system length of the first embodiment. In addition, the longitudinal spherical aberration and the field curvature aberration of the sixth embodiment surpass the first embodiment.

FIG. 30 is a schematic diagram of an optical imaging lens of a seventh embodiment of the disclosure. FIG. 31A to FIG. 31D are diagrams of longitudinal spherical aberration and various aberrations of an optical imaging lens of a seventh embodiment. Please refer to FIG. 30 first. The optical imaging lens 10 of the seventh embodiment of the disclosure is substantially similar to the first embodiment, and the differences between the two are as follows: various optical data, aspheric coefficients, and parameters between the lens elements 1, 2, 3, 4, 5, 6, 7, 8, and 9 are more or less different. In addition, in this embodiment, the third lens element 3 has positive refracting power. The optical axis region 323 of the image-side surface 32 of the third lens element 3 is convex. The periphery region 324 of the image-side surface 32 of the third lens element 3 is convex. The fourth lens element 4 has negative refracting power. The optical axis region 413 of the object-side surface 41 of the fourth lens element 4 is concave, and the periphery region 414 of the object-side surface 41 is concave. The optical axis region 423 of the image-side surface 42 of the fourth lens element 4 is convex. The fifth lens element 5 has negative refracting power. The optical axis region 523 of the image-side surface 52 of the fifth lens element 5 is concave. The optical axis region 613 of the object-side surface 61 of the sixth lens element 6 is convex. The optical axis region 623 of the image-side surface 62 of the sixth lens element 6 is concave. The seventh lens element 7 has positive refracting power. The optical axis region 723 of the image-side surface 72 of the seventh lens element 7 is convex. The optical axis region 823 of the image-side surface 82 of the eighth lens element 8 is concave. It should be noted here that in order to clearly show the drawing, the reference numerals of the optical axis regions and the periphery regions similar to the first embodiment are omitted in FIG. 30.

The detailed optical data of the optical imaging lens 10 of the seventh embodiment is shown in FIG. 32, and the effective focal length of the optical imaging lens 10 of the seventh embodiment is 6.697 mm, the half field of view (HFOV) is 41.962°, the F-number (Fno) is 1.600, the system length is 8.460 mm, and the image height is 6.700 mm.

Various aspheric coefficients of the object-side surface 11 of the first lens element 1 to the image-side surface 92 of the ninth lens element 9 of the seventh embodiment in Equation (1) are shown in FIG. 33.

In addition, the relationship between the important parameters in the optical imaging lens 10 of the seventh embodiment is shown in FIG. 43.

The longitudinal spherical aberration of the seventh embodiment is shown in FIG. 31A, and the deviation of an imaging point of off-axis rays at different heights is controlled within the range of ±16 µm. In the two field curvature aberration diagrams of FIG. 31B and FIG. 31C, the focal length variation of the three representative wavelengths within the entire field of view falls within ±54 µm. The distortion aberration diagram of FIG. 31D shows that the distortion aberration of the seventh embodiment is maintained within the range of ±11.5%.

It can be known from the above description that the half field of view of the seventh embodiment is greater than the half field of view of the first embodiment. In addition, the longitudinal spherical aberration of the seventh embodiment surpass the first embodiment.

Figure 34:
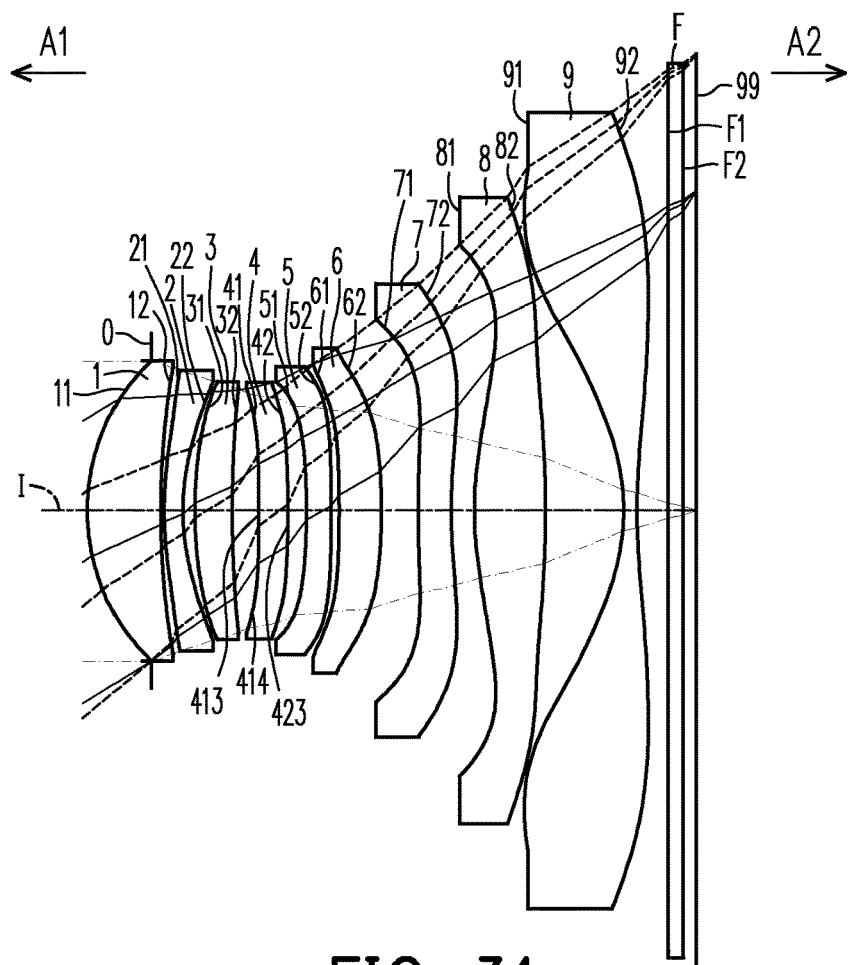
FIG. 34 is a schematic diagram of an optical imaging lens of an eighth embodiment of the disclosure.

FIG. 34 is a schematic diagram of an optical imaging lens of an eighth embodiment of the disclosure. FIG. 35A to FIG. 35D are diagrams of longitudinal spherical aberration and various aberrations of an optical imaging lens of an eighth embodiment. Please refer to FIG. 34 first. The optical imaging lens 10 of the eighth embodiment of the disclosure is substantially similar to the first embodiment, and the differences between the two are as follows: various optical data, aspheric coefficients, and parameters between the lens elements 1, 2, 3, 4, 5, 6, 7, 8, and 9 are more or less different. In addition, in this embodiment, the third lens element 3 has positive refracting power. The optical axis region 413 of the object-side surface 41 of the fourth lens element 4 is concave, and the periphery region 414 of the object-side surface 41 is concave. The optical axis region 423 of the image-side surface 42 of the fourth lens element 4 is convex. The fifth lens element 5 has negative refracting power. The sixth lens element 6 has positive refracting power. It should be noted here that in order to clearly show the drawing, the reference numerals of the optical axis regions and the periphery regions similar to the first embodiment are omitted in FIG. 34.

The detailed optical data of the optical imaging lens 10 of the eighth embodiment is shown in FIG. 36, and the effective focal length of the optical imaging lens 10 of the eighth embodiment is 7.058 mm, the half field of view (HFOV) is 40.126°, the F-number (Fno) is 1.600, the system length is 8.920 mm, and the image height is 6.700 mm.

Various aspheric coefficients of the object-side surface 11 of the first lens element 1 to the image-side surface 92 of the ninth lens element 9 of the eighth embodiment in Equation (1) are shown in FIG. 37.

In addition, the relationship between important parameters in the optical imaging lens 10 of the eighth embodiment is shown in FIG. 43.

Figures 35A, 35B, 35C, 35D:
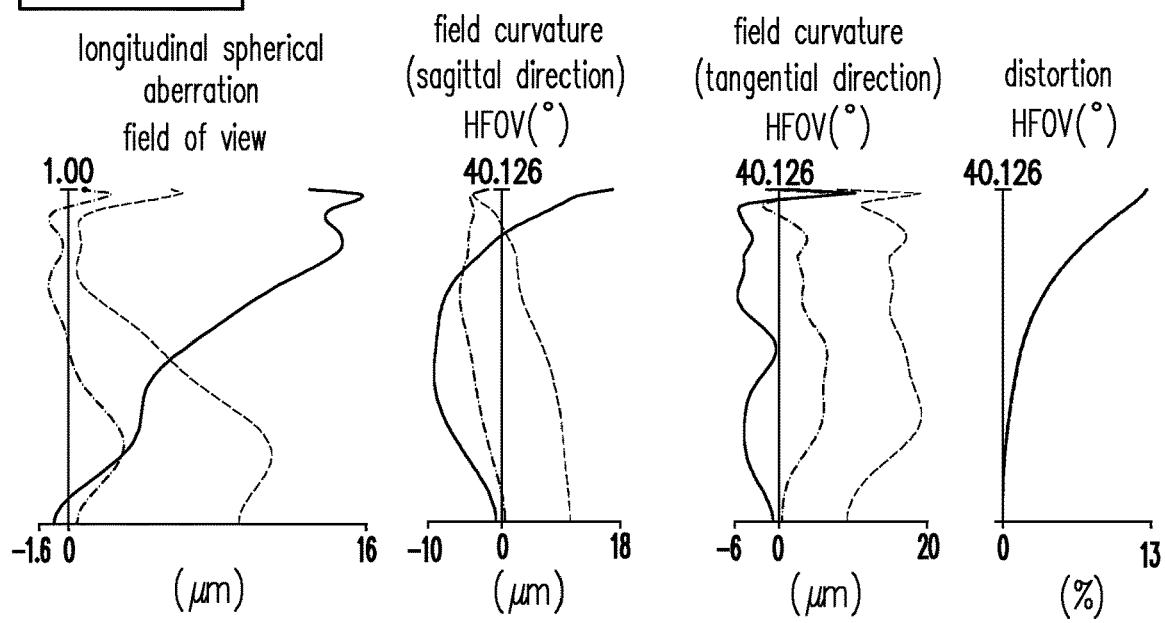
FIG. 35A to FIG. 35D are diagrams of longitudinal spherical aberration and various aberrations of an optical imaging lens of an eighth embodiment.

The longitudinal spherical aberration of the eighth embodiment is shown in FIG. 35A, and the deviation of an imaging point of off-axis rays at different heights is controlled within the range of ±16 µm. In the two field curvature aberration diagrams of FIG. 35B and FIG. 35C, the focal length variation of the three representative wavelengths within the entire field of view falls within +20 µm. The distortion aberration diagram of FIG. 35D shows that the distortion aberration of the eighth embodiment is maintained within the range of ±13%.

It can be known from the above description that the half field of view of the eighth embodiment is greater than the half field of view of the first embodiment. In addition, the longitudinal spherical aberration and the field curvature aberration of the eighth embodiment surpass the first embodiment.

Figure 38:
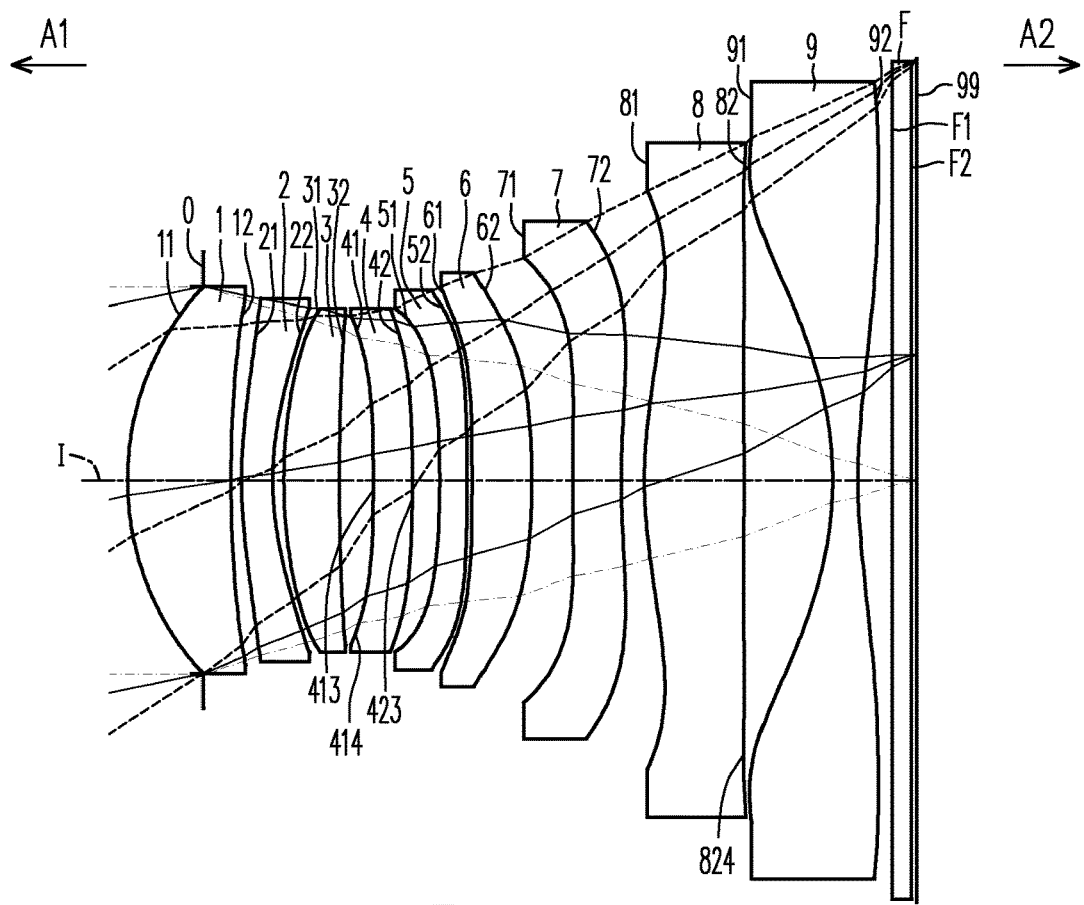
FIG. 38 is a schematic diagram of an optical imaging lens of a ninth embodiment of the disclosure.

FIG. 38 is a schematic diagram of an optical imaging lens of a ninth embodiment of the disclosure. FIG. 39A to FIG. 39D are diagrams of longitudinal spherical aberration and various aberrations of an optical imaging lens of a ninth embodiment. Please refer to FIG. 38 first. The optical imaging lens 10 of the ninth embodiment of the disclosure is substantially similar to the first embodiment, and the differences between the two are as follows: various optical data, aspheric coefficients, and parameters between the lens elements 1, 2, 3, 4, 5, 6, 7, 8, and 9 are more or less different. In addition, in this embodiment, the third lens element 3 has positive refracting power. The fourth lens element 4 has negative refracting power. The optical axis region 413 of the object-side surface 41 of the fourth lens element 4 is concave, and the periphery region 414 of the object-side surface 41 is concave. The optical axis region 423 of the image-side surface 42 of the fourth lens element 4 is convex. The fifth lens element 5 has negative refracting power. The sixth lens element 6 has positive refracting power. The periphery region 824 of the image-side surface 82 of the eighth lens element 8 is concave. It should be noted here that in order to clearly show the drawing, the reference numerals of the optical axis regions and the periphery regions similar to the first embodiment are omitted in FIG. 38.

The detailed optical data of the optical imaging lens 10 of the ninth embodiment is shown in FIG. 40, and the effective focal length of the optical imaging lens 10 of the ninth embodiment is 6.571 mm, the half field of view (HFOV) is 32.733°, the F-number (Fno) is 1.600, the system length is 8.372 mm, and the image height is 4.480 mm.

Various aspheric coefficients of the object-side surface 11 of the first lens element 1 to the image-side surface 92 of the ninth lens element 9 of the ninth embodiment in Equation (1) are shown in FIG. 41.

In addition, the relationship among the important parameters in the optical imaging lens 10 of the ninth embodiment is shown in FIG. 43.

Figures 39A, 39B, 39C, 39D:
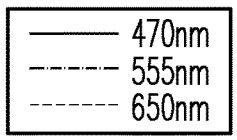
FIG. 39A to FIG. 39D are diagrams of longitudinal spherical aberration and various aberrations of an optical imaging lens of a ninth embodiment.

The longitudinal spherical aberration of the ninth embodiment is shown in FIG. 39A, and the deviation of an imaging point of off-axis rays at different heights is controlled within the range of ±8.2 μm. In the two field curvature aberration diagrams of FIG. 39B and FIG. 39C, the focal length variation of the three representative wavelengths within the entire field of view falls within +10 μm. The distortion aberration diagram of FIG. 39D shows that the distortion aberration of the ninth embodiment is maintained within the range of ±6%.

It can be known from the above description that the longitudinal spherical aberration and the field curvature aberration of the ninth embodiment surpass the first embodiment.

Please refer to FIG. 42 and FIG. 43. FIG. 42 and FIG. 43 are tables of various optical parameters of the first embodiment to the ninth embodiment.

In order to help maintain the thickness and the interval of each lens at an appropriate value, avoid any parameter that is too large to be unconducive to the overall thinning of the optical imaging lens 10, or avoid any parameter that is too small to affect assembly or increase manufacturing difficulty, the optical imaging lens 10 of the embodiments of the disclosure further satisfies the numerical limit of the following conditional expressions.

The optical imaging lens 10 of the embodiment of the disclosure satisfies the following conditional expression: (ImgH+EPD)/(T3+G45+T5+G56)≥7.000, where the preferred range is 7.000 (ImgH+EPD)/(T3+G45+T5+G56) ≤11.000.

The optical imaging lens 10 of the embodiment of the disclosure further satisfies the following conditional expression: ImgH/(G12+T2+G78)≥6.500, where the preferred range is 6.500≤ImgH/(G12+T2+G78)≤17.000.

The optical imaging lens 10 of the embodiment of the disclosure further satisfies the following conditional expression: ImgH/(T2+T4+G56+G78)≥4.300, where the preferred range is 4.300 ImgH/(T2+T4+G56+G78)≤9.000.

The optical imaging lens 10 of the embodiment of the disclosure further satisfies the following conditional expression: (T6+T7+T8+T9)/(T3+G45+T5+G78)≥1.500, where the preferred range is 1.500 (T6+T7+T8+T9)/(T3+G45+T5+G78)≤2.600.

The optical imaging lens 10 of the embodiment of the disclosure further satisfies the following conditional expression: (AAG+BFL)/D11t32≤2.200, where the preferred range is 1.100≤(AAG+BFL)/D11t32≤2.200.

The optical imaging lens 10 of the embodiment of the disclosure further satisfies the following conditional expression: (G12+T2+G34+T4+G56+G78)/(G23+G45+G67) ≤2.700, where the preferred range is 1.000 (G12+T2+G34+T4+G56+G78)/(G23+G45+G67)≤2.700.

The optical imaging lens 10 of the embodiment of the disclosure further satisfies the following conditional expression: EFL*Fno/ImgH≤3.600, where the preferred range is 1.400≤EFL*Fno/ImgH≤3.600.

The optical imaging lens 10 of the embodiment of the disclosure further satisfies the following conditional expression: ImgH/(D12t32+G45)≥3.100, where the preferred range is 3.100 ImgH/(D12t32+G45)≤5.700.

The optical imaging lens 10 of the embodiment of the disclosure further satisfies the following conditional expression: D32t81/(T8+G89+T9)≤2.300, where the preferred range is 0.900 D32t81/(T8+G89+T9)≤2.300.

The optical imaging lens 10 of the embodiment of the disclosure further satisfies the following conditional expression: Fno*D11t71/ALT≤1.700, where the preferred range is 1.000≤Fno*D11t71/ALT≤1.700.

The optical imaging lens 10 of the embodiment of the disclosure further satisfies the following conditional expression: D11t52/(T7+T8+T9)≤2.400, where the preferred range is 0.900 D11t52/(T7+T8+T9)≤2.400.

The optical imaging lens 10 of the embodiment of the disclosure further satisfies the following conditional expression: (TTL+TL)/ImgH≤3.600, where the preferred range is 2.000≤(TTL+TL)/ImgH≤3.600.

The optical imaging lens 10 of the embodiment of the disclosure further satisfies the following conditional expression: D12t41/(T4+G45)≤3.500, where the preferred range is 0.700 D12t41/(T4+G45)≤3.500.

The optical imaging lens 10 of the embodiment of the disclosure further satisfies the following conditional expression: (D12t41+G56+T6)/(G67+T7)≤3.000, where the preferred range is 0.800 (D12t41+G56+T6)/(G67+T7)≤3.000.

The optical imaging lens 10 of the embodiment of the disclosure further satisfies the following conditional expression: (ImgH+EPD)/(AAG+BFL)≥2.700, where the preferred range is 2.700 (ImgH+EPD)/(AAG+BFL)≤5.000.

The optical imaging lens 10 of the embodiment of the disclosure further satisfies the following conditional expression: ImgH/(Fno*(T3+G45+T7))≥2.000, where the preferred range is 2.000 ImgH/(Fno*(T3+G45+T7))≤4.000.

The optical imaging lens 10 of the embodiment of the disclosure further satisfies the following conditional expression: (AAG+BFL)/(T7+T8+T9)≤2.500, where the preferred range is 1.100 (AAG+BFL)/(T7+T8+T9)≤2.500.

In addition, any combination relationships of the parameters of the embodiments may be additionally selected to add lens limits, so as to facilitate the lens design of the same architecture of the disclosure. In view of the unpredictability of an optical system design, under the architecture of the disclosure, the optical imaging lens satisfying the foregoing conditional expressions of the embodiments of the disclosure may have a reduced system length, an increased available aperture, improved imaging quality, or increased assembly yield to improve the defects of the prior art.

The above exemplary limitation relational expressions may also be selectively incorporated in varying amounts to be applied to the embodiments of the disclosure and are not limited thereto. During the implementation of the disclosure, in addition to the above relational expressions, detailed structures such as the concave-convex curved surface arrangement of other lens elements may also be additionally designed for a single lens element or broadly for multiple lens elements to enhance the control of system performance and/or resolution. It should be noted that the details need to be selectively incorporated in other embodiments of the disclosure without conflict.

In summary, the optical imaging lens 10 of the embodiments of the disclosure may achieve the following effects and merits:

1. The longitudinal spherical aberrations, field curvature aberrations, and distortions of various embodiment of the disclosure all comply with usage specifications. In addition, the off-axis rays at different heights of the three red, green, and blue representative wavelengths are all concentrated near the imaging point. It can be seen from the skewness of each curve that the deviation of the imaging point of the off-axis rays at different heights is controlled to have good spherical aberration, aberration, and distortion suppression capabilities. Further referring to imaging quality data, the distances between the three red, green, and blue representative wavelengths are also fairly close to each other, which shows that the disclosure has good concentration of rays with different wavelengths under various states and has excellent chromatic dispersion suppression capability. In summary, the disclosure can produce excellent imaging quality by the design and mutual matching of the lens elements.

2. The optical imaging lens of the embodiments of the disclosure satisfies the following combinations, which is beneficial to simultaneously reducing the F-number, increasing the image height, and improving the resolution: the first lens element has positive refracting power, the periphery region of the image-side surface of the first lens element is concave, the optical axis region of the object-side surface of the second lens element is convex, the optical axis region of the image-side surface of the ninth lens element is concave, and together with $V1+V2 \leq 80.000$ and $V3+V7 \geq 50.000$, where the preferable range is $38.000 \leq V1+V2 \leq 80.000$ and $120.000 \geq V3+V7 \geq 50.000$.

3. The optical imaging lens of the embodiments of the disclosure satisfies the following combinations, which is beneficial to simultaneously reducing the F-number, increasing the image height, and improving the resolution: the periphery region of the image-side surface of the first lens element is concave, the second lens element has negative refracting power, the optical axis region of the object-side surface of the second lens element is convex, the optical axis region of the object-side surface of the seventh lens element is convex, the optical axis region of the image-side surface of the ninth lens element is concave, and together with $V1+V2 \leq 80.000$, where the preferred range is $38.000 \leq V1+V2 \leq 80.000$.

4. The optical imaging lens of the embodiments of the disclosure satisfies the following combinations, which is beneficial to simultaneously reducing the F-number, increasing the image height, and improving the resolution: the first lens element has positive refracting power, the peripheral region of the image-side surface of the first lens element is concave, the second lens element has negative refracting power, the periphery region of the object-side surface of the ninth lens element is convex, the optical axis region of the image-side surface of the ninth lens element is concave, and together with $V3+V7 \geq 50.000$, where the preferred range is $120.000 \geq V3+V7 \geq 50.000$.

5. The optical imaging lens of the embodiments of the disclosure further satisfies that when the number of lens elements among the fourth lens element to the eighth lens element with an Abbe number of less than 40.000 is greater than or equal to 1, the bending of the imaging rays is facilitated such that the image height of the optical imaging lens is increased in the limited system length, where the preferred limitation is that the number of lens elements is greater than or equal to 2, and the most preferred limitation is that the number of lens elements is less than or equal to 3.

6. The optical imaging lens of the embodiments of the disclosure further satisfies that when the number of lens elements among the fourth lens element to the eighth lens element with an Abbe number of greater than 40.000 is greater than or equal to 2, the reduction of material costs is facilitated, where the preferred limitation is that the number of lens elements is greater than or equal to 3, and the most preferred limitation is that the number of lens elements is less than or equal to 4.

7. The optical imaging lens of the embodiments of the disclosure further satisfies $V1+V2+V5 \leq 120.000$, $V3+V4+V7 \leq 175.000$, $1.400 \leq V9/V5$, $V5/V2 \leq 1.350$, or $V9/V1 \leq 1.350$, which is beneficial to increasing the image height in the limited system length, where the preferred range is $57.000 \leq V1+V2+V5 \leq 120.000$, $110.00 \leq V3+V4+V7 \leq 175.000$, $1.400 \leq V9/V5 \leq 3.000$, $0.750 \leq V5/V2 \leq 1.350$, or $0.700 \leq V9/V1 \leq 1.350$.

8. The aspheric design of the lens elements of various embodiment of the disclosure is more beneficial to optimizing the imaging quality.

9. The selection of the plastic material for the lens elements of various embodiment of the disclosure helps to implement lightweight, and can further reduce the weight and save the costs of the optical imaging lens.

10. The selection of the glass material for the lens elements of various embodiment of the disclosure may effectively improve the thermal stability and increase the yield of lens processing and assembly.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be determined by the scope of the appended claims.

What is claimed is:

1. An optical imaging lens, sequentially comprising a first lens element, a second lens element, a third lens element, a fourth lens element, a fifth lens element, a sixth lens element, a seventh lens element, an eighth lens element, and a ninth lens element along an optical axis from an object side to an image side lens, wherein each of the first lens element to the ninth lens element comprises an object-side surface facing the object side and allowing imaging rays to pass through, and an image-side surface facing the image side and allowing the imaging rays to pass through;

the first lens element has positive refracting power, and a periphery region of the image-side surface is concave;

an optical axis region of the object-side surface of the second lens element is convex; and an optical axis region of the object-side surface of the ninth lens element is concave, and an optical axis region of the image-side surface is concave; wherein lens elements of the optical imaging lens are only the nine lens elements, and the optical imaging lens further satisfies following conditional expressions: $V1+V2 \leq 80.000$, $V3+V7 \geq 50.000$ and $ImgH/(D12t32+G45) \geq 3.100$, where V1 is an Abbe number of the first lens element, V2 is an Abbe number of the second lens element, V3 is an Abbe number of the third lens element, V7 is an Abbe number of the seventh lens element, ImgH is an image height of the optical imaging lens, D12t32 is a distance from the image-side surface of the first lens element to the image-side surface of the third lens element on the optical axis, and G45 is an air gap between the fourth lens element and the fifth lens element on the optical axis.

2. The optical imaging lens according to claim 1, wherein the optical imaging lens further satisfies a following conditional expression: $(ImgH+EPD)/(T3+G45+T5+G56) \geq 7.000$, where EPD is an entrance pupil diameter of the optical imaging lens, T3 is a thickness of the third lens element on the optical axis, $T_5$ is a thickness of the fifth lens element on the optical axis, and G56 is an air gap between the fifth lens element and the sixth lens element on the optical axis.

3. The optical imaging lens according to claim 1, wherein the optical imaging lens further satisfies a following conditional expression: $ImgH/(G12+T2+G78) \geq 6.500$, G12 is an air gap between the first lens element and the second lens element on the optical axis, G78 is an air gap between the seventh lens element and the eighth lens element on the optical axis, and T2 is a thickness of the second lens element on the optical axis.

4. The optical imaging lens according to claim 1, wherein the optical imaging lens further satisfies a following conditional expression: $ImgH/(T2+T4+G56+G78) \geq 4.300$, where T2 is a thickness of the second lens element on the optical axis, T4 is a thickness of the fourth lens element on the optical axis, G56 is an air gap between the fifth lens element and the sixth lens element on the optical axis, and G78 is an air gap between the seventh lens element and the eighth lens element on the optical axis.

5. The optical imaging lens according to claim 1, wherein the optical imaging lens further satisfies a following conditional expression: $(T6+T7+T8+T9)/(T3+G45+T5+G78) \geq 1.500$, where T3 is a thickness of the third lens element on the optical axis, T5 is a thickness of the fifth lens element on the optical axis, T6 is a thickness of the sixth lens element on the optical axis, T7 is a thickness of the seventh lens element on the optical axis, T8 is a thickness of the eighth lens element on the optical axis, T9 is a thickness of the ninth lens element on the optical axis, and G78 is an air gap between the seventh lens element and the eighth lens element on the optical axis.

6. The optical imaging lens according to claim 1, wherein the optical imaging lens further satisfies a following conditional expression: $(AAG+BFL)/D11t32 \leq 2.200$, where AAG is a sum of eight air gaps from the first lens element to the ninth lens element on the optical axis, BFL is a distance from the image-side surface of the ninth lens element to an image plane on the optical axis, and D11t32 is a distance from the object-side surface of the first lens element to the image-side surface of the third lens element on the optical axis.

7. The optical imaging lens according to claim 1, wherein the optical imaging lens further satisfies a following conditional expression: $(G12+T2+G34+T4+G56+G78)/(G23+G45+G67) \leq 2.700$, where G12 is an air gap between the first lens element and the second lens element on the optical axis, G23 is an air gap between the second lens element and the third lens element on the optical axis, G34 is an air gap between the third lens element and the fourth lens element on the optical axis, G56 is an air gap between the fifth lens element and the sixth lens element on the optical axis, G67 is an air gap between the sixth lens element and the seventh lens element on the optical axis, G78 is an air gap between the seventh lens element and the eighth lens element on the optical axis, T2 is a thickness of the second lens element on the optical axis, and T4 is a thickness of the fourth lens element on the optical axis.

8. An optical imaging lens, sequentially comprising a first lens element, a second lens element, a third lens element, a fourth lens element, a fifth lens element, a sixth lens element, a seventh lens element, an eighth lens element, and a ninth lens element along an optical axis from an object side to an image side lens, wherein each of the first lens element to the ninth lens element comprises an object-side surface facing the object side and allowing imaging rays to pass through, and an image-side surface facing the image side and allowing the imaging rays to pass through;
- a periphery region of the image-side surface of the first lens element is concave;
- the second lens element has negative refracting power, an optical axis region of the object-side surface is convex, and a periphery region of the image-side surface is concave;
- a periphery region of the image-side surface of the fourth lens element is convex;
- a periphery region of the image-side surface of the sixth lens element is convex;
- an optical axis region of the object-side surface of the seventh lens element is convex; and
- an optical axis region of the image-side surface of the ninth lens element is concave; wherein
- lens elements of the optical imaging lens are only the nine lens elements, the number of lens elements among the fourth lens element to the eighth lens element with an Abbe number of less than 40.000 is greater than or equal to 2, and the optical imaging lens further satisfies a following conditional expression: V1+V2≤80.000, where V1 is an Abbe number of the first lens element and V2 is an Abbe number of the second lens element.

9. The optical imaging lens according to claim 8, wherein the optical imaging lens further satisfies a following conditional expression: EFL*Fno/ImgH≤3.600, where EFL is an effective focal length of the optical imaging lens, Fno is an F-number of the optical imaging lens, and ImgH is an image height of the optical imaging lens.

10. The optical imaging lens according to claim 8, wherein the optical imaging lens further satisfies a following conditional expression: ImgH/(D12t32+G45)≥3.100, where ImgH is an image height of the optical imaging lens, D12t32 is a distance from the image-side surface of the first lens element to the image-side surface of the third lens element on the optical axis, and G45 is an air gap between the fourth lens element and the fifth lens element on the optical axis.

11. The optical imaging lens according to claim 8, wherein the optical imaging lens further satisfies a following conditional expression: D32t81/(T8+G89+T9)≤2.300, where D32t81 is a distance from the image-side surface of the third lens element to the object-side surface of the eighth lens element on the optical axis, T8 is a thickness of the eighth lens element on the optical axis, T9 is a thickness of the ninth lens element on the optical axis, and G89 is an air gap between the eighth lens element and the ninth lens element on the optical axis.

12. The optical imaging lens according to claim 8, wherein the optical imaging lens further satisfies a following conditional expression: Fno*D11t71/ALT≤1.700, where Fno is an F-number of the optical imaging lens, D11t71 is a distance from the object-side surface of the first lens element to the object-side surface of the seventh lens element on the optical axis, and ALT is a sum of thicknesses of the nine lens elements from the first lens element to the ninth lens element on the optical axis.

13. The optical imaging lens according to claim 8, wherein the optical imaging lens further satisfies a following conditional expression: D11t52/(T7+T8+T9)≤2.400, where D11t52 is a distance from the object-side surface of the first lens element to the image-side surface of the fifth lens element on the optical axis, T7 is a thickness of the seventh lens element on the optical axis, T8 is a thickness of the eighth lens element on the optical axis, and T9 is a thickness of the ninth lens element on the optical axis.

14. The optical imaging lens according to claim 8, wherein the optical imaging lens further satisfies a following conditional expression: (TTL+TL)/ImgH≤3.600, where TTL is a distance from the object-side surface of the first lens element to an image plane on the optical axis, TL is a distance from the object-side surface of the first lens element to the image-side surface of the ninth lens element on the optical axis, and ImgH is an image height of the optical imaging lens.

15. An optical imaging lens, sequentially comprising a first lens element, a second lens element, a third lens element, a fourth lens element, a fifth lens element, a sixth lens element, a seventh lens element, an eighth lens element, and a ninth lens element along an optical axis from an object side to an image side lens, wherein each of the first lens element to the ninth lens element comprises an object-side surface facing the object side and allowing imaging rays to pass through, and an image-side surface facing the image side and allowing the imaging rays to pass through;
- the first lens element has positive refracting power, and a periphery region of the image-side surface is concave;
- the second lens element has negative refracting power, and a periphery region of the image-side surface is concave;
- a periphery region of the object-side surface of the ninth lens element is convex, and an optical axis region of the image-side surface is concave; wherein
- lens elements of the optical imaging lens are only the nine lens elements, the number of lens elements among the fourth lens element to the eighth lens element with an Abbe number of less than 40.000 is greater than or equal to 2, and the optical imaging lens satisfies a following conditional expression: V3+V7≥50.000, where V3 is an Abbe number of the third lens element and V7 is an Abbe number of the seventh lens element.

16. The optical imaging lens according to claim 15, wherein the optical imaging lens further satisfies a following conditional expression: D12t41/(T4+G45)≤3.500, where D12t41 is a distance from the image-side surface of the first lens element to the object-side surface of the fourth lens element on the optical axis, T4 is a thickness of the fourth lens element on the optical axis, and G45 is an air gap between the fourth lens element and the fifth lens element on the optical axis.

17. The optical imaging lens according to claim 15, wherein the optical imaging lens further satisfies a following conditional expression: (D12t41+G56+T6)/(G67+T7)≤3.000, where D12t41 is a distance from the image-side surface of the first lens element to the object-side surface of the fourth lens element on the optical axis, G56 is an air gap between the fifth lens element and the sixth lens element on the optical axis, G67 is an air gap between the sixth lens element and the seventh lens element on the optical axis, T6 is a thickness of the sixth lens element on the optical axis, and T7 is a thickness of the seventh lens element on the optical axis.

18. The optical imaging lens according to claim 15, wherein the optical imaging lens further satisfies a following conditional expression: (ImgH+EPD)/(AAG+BFL)≥2.700, where ImgH is an image height of the optical imaging lens, EPD is an entrance pupil diameter of the optical imaging lens, AAG is a sum of eight air gaps from the first lens element to the ninth lens element on the optical axis, and BFL is a distance from the image-side surface of the ninth lens element to an image plane on the optical axis.

19. The optical imaging lens according to claim 15, wherein the optical imaging lens further satisfies a following conditional expression: $\text{ImgH}/(\text{Fno}*(T3+G45+T7)) \geq 2.000$, where ImgH is an image height of the optical imaging lens, Fno is an F-number of the optical imaging lens, T3 is a thickness of the third lens element on the optical axis, T7 is a thickness of the seventh lens element on the optical axis, and G45 is an air gap between the fourth lens element and the fifth lens element on the optical axis.

20. The optical imaging lens according to claim 15, wherein the optical imaging lens further satisfies a following conditional expression: $(\text{AAG}+\text{BFL})/(T7+T8+T9) \leq 2.500$, where AAG is a sum of eight air gaps from the first lens element to the ninth lens element on the optical axis, BFL is a distance from the image-side surface of the ninth lens element to an image plane on the optical axis, T7 is a thickness of the seventh lens element on the optical axis, T8 is a thickness of the eighth lens element on the optical axis, and T9 is a thickness of the ninth lens element on the optical axis.

* * * * *